US009020294B2

(12) United States Patent
Leontaris et al.

(10) Patent No.: US 9,020,294 B2
(45) Date of Patent: Apr. 28, 2015

(54) SPATIOTEMPORAL METRICS FOR RATE DISTORTION OPTIMIZATION

(71) Applicant: Dolby Laboratories Licensing Corporation, San Francisco, CA (US)

(72) Inventors: Athanasios Leontaris, Mountain View, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 114 days.

(21) Appl. No.: 13/736,616

(22) Filed: Jan. 8, 2013

(65) Prior Publication Data

US 2013/0182971 A1 Jul. 18, 2013

Related U.S. Application Data

(60) Provisional application No. 61/588,015, filed on Jan. 18, 2012.

(51) Int. Cl.
*G06T 5/00* (2006.01)
*G06T 7/00* (2006.01)
*H04N 19/176* (2014.01)
(Continued)

(52) U.S. Cl.
CPC ............... *G06T 5/002* (2013.01); *G06T 7/0002* (2013.01); *G06T 2207/10016* (2013.01); *G06T 2207/20021* (2013.01); *G06T 2207/30168* (2013.01); *H04N 19/176* (2014.11); *H04N 19/147* (2014.11); *H04N 19/103* (2014.11); *H04N 19/117* (2014.11); *H04N 19/124* (2014.11);
(Continued)

(58) Field of Classification Search
CPC .................. G06T 5/002; G06T 7/0002; G06T 2207/10016; G06T 2207/20021; G06T 2207/3016; H04N 19/00066; H04N 19/0009; H04N 19/00175; H04N 19/002; H04N 19/00278; H04N 19/00909; H04N 19/00018; H04N 19/00351; H04L 65/60
USPC .......................... 382/239, 236, 232, 251, 275; 375/240.03, 240.16, 240.29, 240.26, 375/E07.193, 240.2, 342, 240.13; 348/409, 348/420, 616, 699, 416, 448
See application file for complete search history.

(56) References Cited

U.S. PATENT DOCUMENTS 5,621,467 A  4/1997  Chien
6,057,892 A  5/2000  Borer
(Continued)

FOREIGN PATENT DOCUMENTS

EP  1841235  10/2007
WO  2008/106994  9/2008

OTHER PUBLICATIONS

Sullivan et al. "Rate-distortion optimization for video compression", IEEE Signal Processing Magazine published Nov. 1998, p. 74-90.*
(Continued)

*Primary Examiner* — Mekone Bekele
(74) *Attorney, Agent, or Firm* — John W. Carpenter

(57) ABSTRACT

Spatial and temporal metrics are computed for a picture or regions within a picture to determine the impact of coding and quantization on the quality of an encoded picture. Prediction mode decisions and quantization optimization algorithms are used to create a compressed bit stream that minimizes coding artifacts. Pre-processing techniques are also used to suppress coding artifacts that reduce picture quality.

24 Claims, 9 Drawing Sheets

(51) Int. Cl.
H04N 19/147 (2014.01)
H04N 19/117 (2014.01)
H04N 19/124 (2014.01)
H04N 19/154 (2014.01)
H04N 19/86 (2014.01)
H04N 19/103 (2014.01)
H04N 19/19 (2014.01)

(52) U.S. Cl.
CPC .............. *H04N19/154* (2014.11); *H04N 19/19* (2014.11); *H04N 19/86* (2014.11)

(56) References Cited

U.S. PATENT DOCUMENTS

| | | | |
|---|---|---|---|
| 6,106,470 A * | 8/2000 | Geiser et al. | 600/443 |
| 6,360,017 B1 | 3/2002 | Chiu | |
| 6,741,655 B1 * | 5/2004 | Chang et al. | 375/240.26 |
| 7,296,231 B2 * | 11/2007 | Loui et al. | 715/723 |
| 7,466,774 B2 | 12/2008 | Boyce | |
| 7,620,108 B2 | 11/2009 | Miao | |
| 8,326,063 B2 * | 12/2012 | Boon et al. | 382/238 |
| 8,614,741 B2 * | 12/2013 | Carlbom et al. | 348/143 |
| 8,705,611 B2 * | 4/2014 | Suzuki et al. | 375/240 |
| 8,768,062 B2 * | 7/2014 | Lakshmanan et al. | 382/186 |
| 2006/0045354 A1 * | 3/2006 | Hanna et al. | 382/224 |
| 2006/0198439 A1 | 9/2006 | Zhu | |
| 2009/0086816 A1 | 4/2009 | Leontaris | |
| 2010/0157147 A1 | 6/2010 | Bellers | |
| 2011/0090960 A1 * | 4/2011 | Leontaris et al. | 375/240.12 |
| 2011/0170602 A1 * | 7/2011 | Lee et al. | 375/240.16 |
| 2012/0114245 A1 * | 5/2012 | Lakshmanan et al. | 382/186 |

OTHER PUBLICATIONS

ITU-T, "Video Codec for Audiovisual Services at pX64 kbits", ITU-T Rec. H.261, v.2: Mar. 1993.

ISO/IEC JTC1, "Coding of Moving Pictures and Associated Audio for Digital Storage Media at up to about 1.5 Mbit/s—Part 2: Video," ISO/IEC 11172 (MPEG-1), Nov. 1993.

ITU-T and ISO/IEC JTC 1, "Generic Coding of Moving Pictures and Associated Audio Information—Part 2: Video", ITU-T Rec. H.262 and ISO/IEC 13818-2 (MPEG-2) Nov. 1994.

ITU-T, "Video Coding for Low Bit Rate Communication", ITU-T, Rec. H.263, v2, Jan. 1998.

ISO/IEC JTC 1, "Coding of Audio-visual Objects—Part 2: Visual", ISO/IEC 14496-2 (MPEG-4 Part 2), Jan. 1999.

JVT reference Software version Jm13.2, Karsten Suhring.

T-REC-H.264 "Advanced Video Coding for Generic Audiovisual Services" Mar. 2003.

SMPTE 421M, "VC-1 Compressed Video Bitstream Format and Decoding Process", Apr. 2006.

Leontaris, A. et al. "Drift Characterization of Intra Prediction and Quantization in H.264" in Proc. Data Compression Conference, Mar. 2008.

Ortega, A. et al. "Rate-Distortion Methods for Image and Video Compression" IEEE Signal Processing Magazine, pp. 23-50, Nov. 1998.

Sullivan, G.J. et al. "Rate-Distortion Optimization for Video Compression", IEEE Signal Processing Magazine, vol. 15, No. 6, Nov. 1998, pp. 74-90.

Leontaris, A. et al. "Rate Control for Flicker Artifact Suppression in Motion JPEG2000", in Proc. IEEE International Conference on Acoustics, Speech and Signa Processing, May 2006, vol. 2, pp. 41-44.

Kuge, T. "Wavelet Picture Coding and its Several Problems of the Application to the Interlace HDTV and the Ultra-High Definition Images" in Proc. IEEE International Conference on Image Processing, Jun. 2002, vol. 3, pp. 217-220.

Carney, T. et al. "Effects of Dynamic Quantization Noise on Video Quality", in Proc. SPIE Human Vision and Electronic Imaging IV, May 1999, pp. 141-151.

Kato, T. et al., "On a Relationship Between Flicker Artifacts and Quantization Error for Motion JPEG2000", in Proc. FIT2003, J-039, Sep. 2003.

Becker, A. et al. "Flicker Reduction in Intraframe Codecs" in Proc. IEEE Data Compression Conference, Mar. 2004, pp. 252-261.

Fan, X. et al. "Flicking Reduction in all Intra Frame Coding" Joint Video Team of ISO/IEC MPEG and ITU-T VCEG, JVT-E070, Oct. 2002.

Sakaida, S. et al. "Adaptive Quantization Control for Reducing Flicker of AVC/H.264 Intra Frames", in Proc. Picture Coding Symposium, Dec. 2004.

Kuzpet, Y. et al. "Post-Processing for Flicker Reduction in H.264/AVC", Proc. of the 16th Picture Coding Symposium (PCS 2007), Lisbon, Portugal, Nov. 2007.

Chono, K. et al. "Detented Quantization to Suppress Flicker Artifacts in Periodically Inserted Intra-Coded Pictures in H.264 Video Coding", in Proc. IEEE International Conference on Image Processing, Oct. 2006, pp. 1713-1716.

Leontaris, A. et al. "Flicker Suppression in JPEG2000 Using Segmentation-based Adjustment of Block Truncation Lengths" in Proc. IEEE International Conference on Acoustics, Speech and Signal Processing, Honolulu, Hawaii, Apr. 15-20, 2007.

* cited by examiner

| | | |
|---|---|---|
| Macroblock partitions | 1 macroblock partition of 16x16 luma samples and associated chroma samples 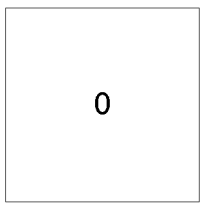 | 2 macroblock partitions of 16x8 luma samples and associated chroma samples 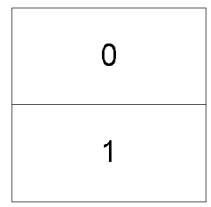 |
| Sub-macroblock partitions | 1 sub-macroblock partition of 8x8 luma samples and associated chroma samples 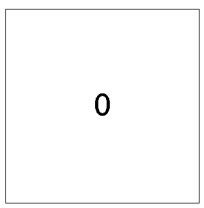 | 2 sub-macroblock partitions of 8x4 luma samples and associated chroma samples 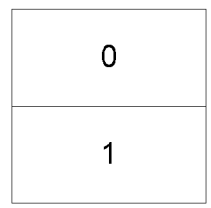 |
| Macroblock partitions | 2 macroblock partitions of 8x16 luma samples and associated chroma samples 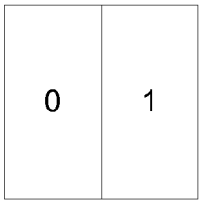 | 4 macroblock partitions of 8x8 luma samples and associated chroma samples 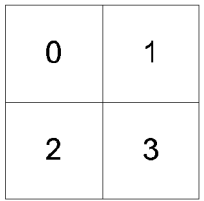 |
| Sub-macroblock partitions | 2 sub-macroblock partitions of 4x8 luma samples and associated chroma samples 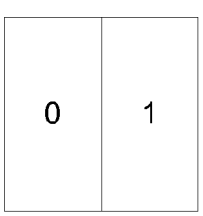 | 4 sub-macroblock partitions of 4x4 luma samples and associated chroma samples 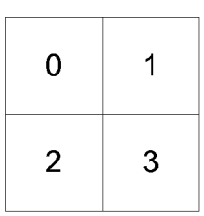 |

FIG. 3

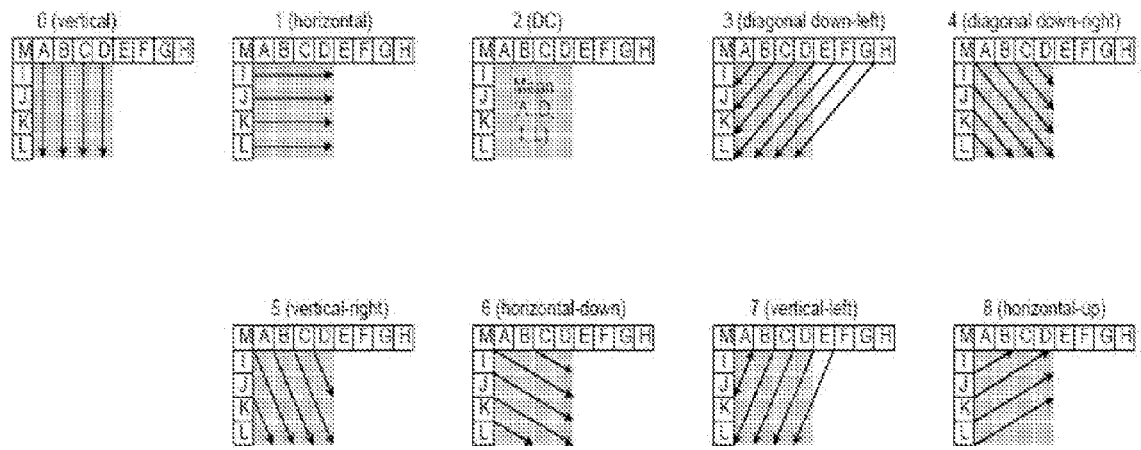
FIG. 4
| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |
FIG. 5A
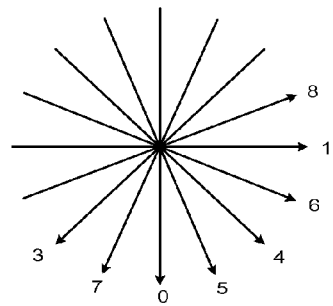
FIG. 5B

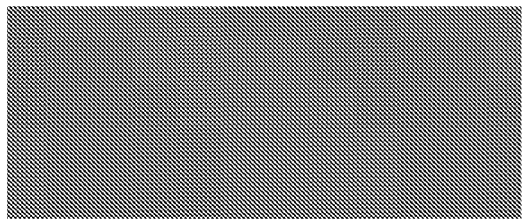
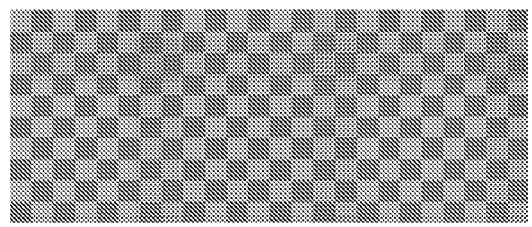
FIG. 8A                    FIG. 8B
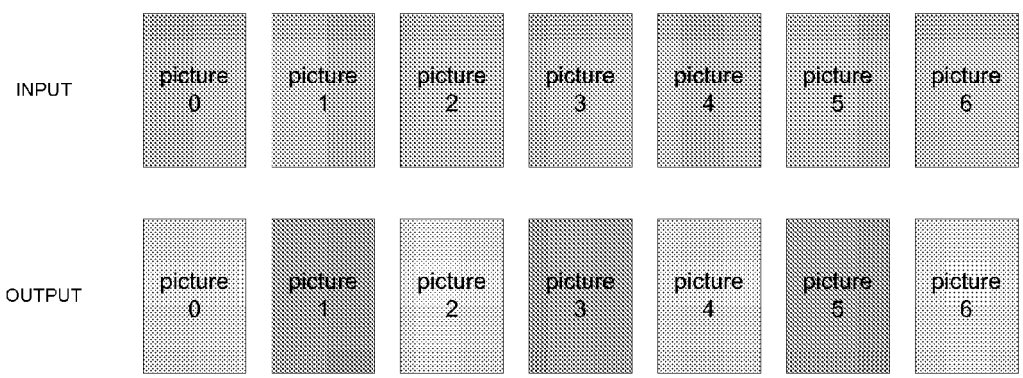
FIG. 9
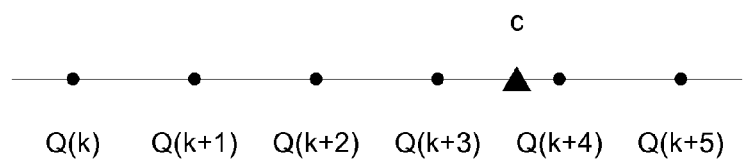
FIG. 16

SPATIOTEMPORAL METRICS FOR RATE DISTORTION OPTIMIZATION

CROSS REFERENCE TO RELATED APPLICATIONS

This application claims the benefit of priority to related, Provisional U.S. Patent Application No. 61/588,015 filed on 18 Jan. 2012 entitled "Spatiotemporal Metrics for Rate Distortion Optimization" by Athanasios Leontaris, et al, hereby incorporated by reference in its entirety.

TECHNICAL FIELD

The present invention relates to coding techniques for video data, such as video data for video compression, storage, and/or transmission systems. More particularly, an embodiment of the present invention relates to the computation and application of metrics to reduce artifacts that reduce picture quality in video data.

BACKGROUND

Existing video compression systems based on international standards such as ISO MPEG-1, MPEG-2, MPEG-4 Part 2, MPEG-4 Part 10 AVC/ITU-T H.264, H.261, H.263, and VC-1 rely, among others, on intra and inter coding in order to achieve compression. In intra coding, spatial prediction methods are used. In inter coding, compression is achieved by exploiting the temporal correlation that may exist between pictures. Previously coded pictures are used as prediction references for future pictures and motion and/or illumination change estimation and compensation is used to predict one picture from the other. The prediction residuals are then transformed (e.g. discrete cosine transform, or wavelets, or some other decorrelating transform), quantized, and entropy coded given a certain bit rate constraint. See the following references for additional information regarding video compression for the standards cited above: (1) MPEG-1—ISO/IEC JTC 1, "Coding of moving pictures and associated audio for digital storage media at up to about 1.5 Mbit/s—Part 2: Video," ISO/IEC 11172 (MPEG-1), November 1993; (2) MPEG-2—ITU-T and ISO/IEC JTC 1, "Generic coding of moving pictures and associated audio information—Part 2: Video," ITU-T Rec. H.262 and ISO/IEC 13818-2 (MPEG-2), November 1994; (3) MPEG-4 Part 2—ISO/IEC JTC 1, "Coding of audio-visual objects—Part 2: Visual," ISO/IEC 14496-2 (MPEG-4 Part 2), January 1999; (4) MPEG-4 Part 10 AVC/ITU H.264-JVT reference software version JM13.2, and Advanced video coding for generic audiovisual services, (5) H.261—ITU-T, "Video codec for audiovisual services at px64 kbits/s," ITU-T Rec. H.261, v2: March 1993; (6) H.263—ITU-T, "Video coding for low bit rate communication," ITU-T Rec. H.263, v2: January 1998; and (7) VC-1—SMPTE 421M, "VC-1 Compressed Video Bitstream Format and Decoding Process", April 2006.

A generic intra predictor for a block or region is depicted in FIG. 1. An arbitrary coding order is depicted. The current block 101 is predicted from reconstructed pixels that belong to blocks 102 that have already been coded. Let p(i,j,t) denote a pixel with coordinates (i,j) in frame t in the current block b, hence (i, j)∈b. Let p̂(i,j,t) denote the prediction value for the previously mentioned pixel. Let B denote the set of coordinates of all pixels that have already been coded. The prediction value p̂(i,j,t) can be given as shown in Eq. 1 below:

$$\hat{p}(i, j, t) = \sum_{(m,n) \in B} (w(i, j, m, n) \times p(m, n, t)) \quad \text{Eq. 1}$$

A generalized linear predictor as shown above in Eq. 1 is thus a weighted sum of potentially all pixels that have already been decoded where w(i,j,m,n) represents the weights to be applied. In practice, decoded pixels that are in the proximity of the pixels being predicted will be more correlated and will dominate the prediction by assuming larger weights than other pixels. In H.264/AVC, only blocks in the immediate neighborhood of the current block contribute to its intra prediction.

Prediction samples are drawn from already decoded pixels; hence the coding architecture assumes a closed loop. A closed-loop architecture ensures exact replication of the operation at the decoder negating drift that would be the result of predicting the pixel blocks from the original uncompressed pixel values. The latter is also known as an open-loop prediction architecture. Closed-loop prediction may be illustrated as in FIG. 2. As depicted in FIG. 2, coding 121 is performed on a prediction residual to provide a coded residual. The coded residual is buffered 123 and then used to generate a prediction 125. The prediction 125 and the input pixel are then combined to provide the prediction residual. An input pixel is predicted as a function of coded pixels whose reconstructed values are combined to form the prediction. Past errors can accumulate and propagate to future pixels. Note that both open-loop and closed-loop architectures exist for temporal prediction. Further note that even though the term "block," as used herein, may refer to the pixel area that is inter- or intra-predicted, the pixel areas may be arbitrary image regions that are not necessarily shaped as a rectangle and can be of arbitrary size.

Inter prediction differs from intra prediction in that the prediction samples are drawn from previously coded pictures. Inter prediction is more beneficial compared to intra prediction when temporal correlation is greater than spatial correlation. A generic expression for linear inter prediction is shown below in Eq. 2. Let T denote the set of decoded pictures that are available for inter prediction of picture t. Let B(t) denote the set of coordinates of pixels in picture t. The prediction value p̂(i,j,t) for the pixel in coordinates (i,j) of picture t will be given as shown in Eq. 2:

$$\hat{p}(i, j, t) = \sum_{\tau \in T} \sum_{(m,n) \in B(\tau)} (w(i, j, m, n, t, \tau) \times p(m, n, \tau)) \quad \text{Eq. 2}$$

The linear combination weights, w(i, j, m, n, t, τ), are dependent on the temporal index of each picture. Both Eq. 1 and Eq. 2 share a lot of similarities being the generic expressions for intra and inter prediction. However, this is because the above expressions are unconstrained, rendering the problem of finding the optimal weights extremely complex.

In practical video codec designs, such as H.264/AVC, intra and inter prediction are constrained and defined in detail. A variety of intra prediction modes have been introduced which can also considerably improve coding performance compared to older standards. H.264/AVC employs intra prediction in the pixel domain that may be applied on 4×4, 8×8, or 16×16 pixel luma and chroma blocks. For the luma component, there are in total 9 prediction modes for 4×4 blocks (see, for example, FIG. 4 and FIG. 5A), 9 modes for 8×8 blocks, and 4 modes for 16×16 blocks (see, for example, FIG. 6). The nine prediction mode types for 4×4 and 8×8 intra prediction are Vertical, Horizontal, DC, Diagonal Down Left, Diagonal Down Right, Vertical Right, Horizontal Down, Vertical Left, and Horizontal Up as depicted in FIG. 4. Apart from the DC prediction mode, that predicts the block as the average value of the neighboring causal predictor pixels, all other prediction modes assume some type of directionality in the source signal. However, not all prediction modes are always available, i.e., if the top block belongs to a different slice or if this is the first row in the image, then the vertical prediction modes cannot be used. For 16×16 intra prediction the four possible modes are Vertical, Horizontal, DC, and Plane prediction (see FIG. 6), which predicts the entire macroblock by interpolating processed values from the top and the left of the macroblock. For the baseline, main, and high profiles of H.264/AVC, chroma sample intra prediction uses modes different to the ones for luma. Both chroma components use the same chroma intra prediction mode, which is applied on the entire chroma block size, i.e. for 4:2:0 it is 8×8. The four prediction modes for chroma samples are similar in concept to the 16×16 luma modes but differ in implementation. For the High 4:4:4 profile, however, the chroma samples adopt the luma intra prediction modes. Note that intraprediction type (16×16, 8×8, or 4×4) or direction may be used as a signaling mechanism for metadata representation.

In H.264/AVC, inter prediction is constrained to predict pixels $p_n(i,j,t)$ of a block b in picture t as $\hat{p}(i,j,t)$ as shown in Eq. 3 below:

$$\hat{p}(i, j, t) = \beta + \sum_{k \in \{ref\_LIST0, ref\_LIST1\}} (\alpha_k \times p(i + v_{b,x}(t-k, t), j + v_{b,y}(t-k, t), t-k)) \quad \text{Eq. 3}$$

The summation involves two prediction hypotheses: one from reference picture ref_LIST_0 and another from reference picture ref_LIST_1. A reference picture list in H.264/AVC contains previously coded pictures. P-coded slices (P_SLICE) have access to picture list LIST_0, while B-coded slices (B_SLICE) have access to both picture lists LIST_0 and LIST_1 that enable bi-prediction (a weighted average of two prediction hypotheses, each one originating from each list). Term β is a weighted prediction offset, and terms $\alpha_k$ are weighted prediction gains that depend on the slice and the prediction reference index. Note that k may take smaller or larger values than t. The location of the samples for each prediction hypothesis is derived through a motion vector that is uniform for pixels belonging to the same block. The motion vector $v_b$ is written as shown in Eq. 4 below:

$$v_b(t-k,t) = [v_{b,x}(t-k,t) v_{b,y}(t-k,t)] \quad \text{Eq. 4}$$

The motion vector yields the translational parameters required to predict a pixel in block b of picture t from pixels of picture t−k.

For inter prediction in H.264/AVC, one can consider for motion compensation a quad-tree block coding structure to predict a 16×16 Macroblock (MB) as is also depicted in FIG. 3. The entire MB could be predicted as a single 16×16 partition with a single motion vector, or it could be partitioned and predicted using smaller partitions down to a 4×4 block size. For each partition a different motion vector could be transmitted, whereas for the bi-predictive case, one may also transmit two sets of motion vectors per block, one for each prediction reference list (lists 0 and 1). Furthermore, the standard allows for the consideration of up to 16 references for motion compensated prediction which could be assigned down to an 8×8 block size. Motion compensation could also be performed down to quarter pixel accuracy while also one could consider weighted prediction methods to improve performance, especially during illumination change transitions. Hence there are in general single-list inter prediction modes for 16×16, 16×8, 8×16, 8×8, 8×4, 4×8, and 4×4 blocks, most of which have counterparts for two-list prediction (bi-prediction), which results to multi-hypothesis motion compensated prediction. Additional inter prediction modes also include the SKIP and DIRECT modes, that derive prediction block location information from spatial or temporal neighbors.

The multitude of the above described prediction modes presents the encoder designer with a difficult problem. The goal is to select the suitable mode such that the overall picture or picture sequence distortion is minimized. Coding mode decision in modern video codecs, such as the JM software, is done through rate-distortion (R-D) optimization. See, for example, A. Ortega and K. Ramchandran, "Rate-distortion methods for image and video compression," *IEEE Signal Processing Magazine*, pp. 23-50, November 1998 and G. J. Sullivan and T. Wiegand, "Rate-distortion optimization for video compression", *IEEE Signal Processing Magazine*, vol. 15, no. 6, November 1998, pp. 74-90. Lagrangian minimization selects the coding strategy that minimizes a cost that is a weighted sum of the distortion D (e.g. Sum of Squared Errors) and the bit usage R as shown in Eq. 5 below:

$$J = D + \lambda R \quad \text{Eq. 5}$$

Term λ is the Lagrangian multiplier. This process can be performed on a picture, region, or block basis. In one case, one can encode a block with all possible intra and inter prediction modes and select the one with the minimum cost. One possible, and widely used, distortion metric, the sum of squared errors of the pixels of the predicted block, can be written as shown in Eq. 6 below:

$$SSE = \sum_{(j,i) \in b} (p(j, i, t) - \hat{p}(j, i, t))^2 \quad \text{Eq. 6}$$

Term b denotes the current block; hence pixels considered in this distortion metric are only those of the current block. However, this can create substantial perceptual problems.

The prediction of a block with either a spatial/intra or temporal/inter mode is followed by transform and quantization of the prediction residual. For a codec based on the H.264/AVC video coding standard (see, for example, Advanced video coding for generic audiovisual services, T-REC-H.264, March 2003), the process of transform and quantization for the most basic case of a 4×4 pixel block is now described. Let X denote the original 4×4 pixel block that is to be transformed. The transformed 4×4 pixel block Y is written as $Y = HXH^T$ where $H^T$ denotes the transpose of H. Next, the transformed block Y is quantized. Quantization involves multiplication of Y by a matrix, followed by subsequent bit-wise shift of the multiplied coefficients by some factor. A forward 4×4 quantization matrix A(Q) and a shifting factor E(Q) are indexed by the quantization parameter (QP) value Q. In general, the lower the QP value, the finer the quantization, and hence the lower the induced distortion. Let $\otimes$ denote the operation between two matrices U and V such that for $Z = U \otimes V$, there is $z(i,j) = u(i,j) \times v(i,j)$, where small-letter terms denote elements of their respective matrices. The quantized coefficients $\tilde{Y}$ are obtained by the following procedure, as implemented in the Joint Model (JM) reference software (see, for example, JVT reference software version JM13.2) and shown in Eq. 6 below:

$$\tilde{Y}=\text{sign}\{Y\}[(|Y|\otimes A(Q)+F(Q)\times 2^{15+E(Q)})>>(15+E(Q))] \quad \text{Eq. 7}$$

where F(Q) is a quantization rounding offsets matrix. The bit-wise right shift operator ">>" is applied to every element of the 4×4 matrix. The resulting matrix $\tilde{Y}$ is then compressed using entropy coding and transmitted to the decoder, which has to apply the following process to obtain the reconstructed values $\hat{Y}$ of the block's transform coefficients as shown in Eq. 8 below:

$$\hat{Y}=\{[(\tilde{Y}\otimes (B(Q)<<4))<<E(Q)]+8\}>>4 \quad \text{Eq. 8}$$

The inverse 4×4 quantization matrix B(Q) and the shifting factor E(Q) are both indexed by the QP Q. The final reconstructed residual block $\hat{X}$ is given as shown in Eq. 9 below:

$$\hat{X}=(H_{inv}\hat{Y}H_{inv}^T+32)>>6 \quad \text{Eq. 9}$$

If the value of the QP Q used was low enough, then the reconstructed block X will be close to X. The reconstructed values depend also on the quantization offsets F(Q), which may bias towards reconstruction to a lower or greater value. Note, however, the prominent use of rounding. Rounding may introduce distortion since it involves sacrificing part of the signal fidelity. Rounding distortion propagation is one of the factors that may result to an increase in distortion even though Q is decreased. Rounding distortion also accumulates as is evident from Eqs. 7, 8, and 9. Furthermore, rounding in H.264/AVC (see, for example, "Advanced video coding for generic audiovisual services" cited above) is biased in favor of positive values. This is illustrated in FIG. 7 and is an additional source of distortion that is also asymmetric in nature; i.e., the distortion resulting from coding −x is not necessarily equal to the distortion resulting from coding +x. To have a better understanding of quantization in a state-of-the-art video coding standard, such as H.264/AVC, it can be simplified as shown in Eq. 10 below:

$$V(v, Q) = \left\lfloor \frac{q_n(Q)\times v + f(Q)}{q_d(Q)} \right\rfloor \quad \text{Eq. 10}$$

Let v denote the value to be quantized and let V(v,Q) denote the quantized value for input value v and QP Q. The numerator $q_n(Q)$ and the denominator $q_d(Q)$ are primarily functions of the quantization parameter Q. The quantization offset f(Q) may also depend on the QP Q, among others. The reconstruction of v to $\hat{v}$ is given by the following inverse quantization process shown in Eq. 11 below:

$$\hat{v}=(V(v,Q)\times q_n^{-1}(Q)\times q_d^{-1}(Q)+2^m)>>(m+1) \quad \text{Eq. 11}$$

The term m is larger than 1. Do note that the following expressions hold: $q_n^{-1}(Q)\neq(q_n(Q))^{-1}$ and $q_d^{-1}(Q)\neq(q_d(Q))^{-1}$.

During quantization an important problem arises: given certain reconstruction values that are indexed by the transmitted quantization indices, what is the best index to transmit given the value of the current coefficient? See, for example, the problem depicted in FIG. 16. Given a set of reconstruction points Q(i) that are derived at the decoder by transmitting the index i, one may seek to find the index i that minimizes some distortion metric. If the optimization metric is the absolute difference or the squared difference for this coefficient, then, obviously, the optimal reconstruction index is index k+4. However, in a two-dimensional signal, such as a video signal, the reconstruction level of a coefficient/pixel affects the neighboring ones. Furthermore, the effect is more complex perceptually. There will be, for example, cases where transmitting index k+3 will make more sense, even if it sounds counter-intuitive. There could also be situations where transmitting index k+2 is the optimal thing to do. A special case of this problem is whether to transmit the lower value (k+3) or the upper value (k+4).

Rate-distortion-optimized mode decision along with a naïve quantization strategy at the encoder can contribute to artifacts such as those depicted in FIGS. 8A and 8B. Assume that something as simple as a uniform frame where the luminance Y value is 111 and the U and V components are both set to 128 is to be compressed. The JM reference software is used and the QP is set to the value 32. The input and the reconstructed frames are depicted in FIG. 8A and FIG. 8B, respectively (contrast is stretched for printing purposes; distortion is quite perceivable on a computer display).

The top left block in FIG. 8B is coded with the DC intra prediction mode, and its prediction value is 128. The original value of 111 results to a residual of −17, which after coding, reconstructs the block as 112. The encoder then codes the second block of the top row, whose original value is 111. Horizontal or DC prediction from the top left block yields a prediction value of 112, resulting to a residual of −1. After the residual is quantized, the block is reconstructed to a value of 110. The description may be similarly extended to the first two blocks of the second row. Consequently, reconstruction values of 112 and 110 alternate in a checkerboard pattern. In terms of SSE, all blocks have an SSE of 1×16×16, so the block-wise distortion is the same. Visually, however, the result is disappointing. The reasons for this failure are multiple:

(a) Certain block average (DC) values and QP combinations fail to exactly reconstruct the DC value.
(b) The residual is always transmitted in full without any regard for its consequences.
(c) Block-based mode decision in the JM software and most commercial implementations of H.264/AVC optimizes block R-D performance without consideration of the perceptual impact and the impact to the neighboring blocks.

While factors (b) and (c) are within the encoder's control and can be addressed, factor (a) largely depends on the transform and quantization design in H.264/AVC. Note that the mode decision could have completely disregarded the residual and still have resulted to the same distortion. Since this would reduce the number of residual bits needed for transmission, it would have resulted in better R-D performance. The example discussed above shows a case of serious perceptual distortion in the spatial domain that is a result of naive application of mode decision and quantization. The discussion below illustrates the same problem in the temporal domain.

The distortion problem can also manifest in the temporal domain as depicted in FIG. 9. Let the input sequence be composed of pictures that are flat and have the luma Y value 111, so, as depicted in FIG. 9, each input picture has the same uniform luma value and appears to have the same shading. Now assume that there is access to some new advanced mode decision algorithm that can encode a flat picture by avoiding the problems of FIG. 8. Let the quantization parameter value be 32. Picture 0 is reconstructed with a uniform value of 110. The encoder then proceeds to code picture 1. It now has access to both intra and inter prediction modes. For some reason, the mode decision algorithm selects to code the entire picture with inter 16×16 prediction from the previous picture using all-zero motion vectors. Thus, each block in picture 1 that has the original value 111 is predicted as 110. The prediction residual is 1 and is coded and reconstructed as 2, leading to a reconstructed value for the entire frame of 112.

The rest of the pictures are coded in a similar manner leading to the alternating luma values as depicted in the output pictures of FIG. 9. This simple example shows that mode decision and quantization can create flickering in the temporal domain even if it is addressed in the spatial domain.

Work has been done in the past towards addressing temporal flickering. In a paper by A. Leontaris, Y. Tonomura, and T. Nakachi, "Rate control for flicker artifact suppression in motion JPEG2000," in *Proc. IEEE International Conference on Acoustics, Speech, and Signa Processing*, May 2006, vol. 2, pp. 41-44, the temporal flicker artifact was categorized into: (a) flickering due to small temporal variations in the input signal luma component that give rise to large differences in the de-quantized coefficients (see T. Kuge, "Wavelet picture coding and its several problems of the application to the interlace HDTV and the ultra-high definition images," in *Proc. IEEE International Conference on Image Processing*, June 2002, vol. 3, pp. 217-220), and (b) flicker artifact due to uneven quantization among similar collocated blocks across subsequent frames. Type (a) artifact is content-dependent and is perceived as ripples mainly across edges. Type (b) artifact is perceivable in static areas (often the background) across consecutive frames; it is also augmented when intra-frame coders (JPEG2000 or H.264/AVC constrained to use only intra-coded pictures) are used. It was first suggested in T. Carney, Y. C. Chang, S. A. Klein, and D. G. Messerschmitt, "Effects of dynamic quantization noise on video quality," in *Proc. SPIE Human Vision and Electronic Imaging IV*, May 1999, pp. 141-151 and T. Kato, S. Tanabe, H. Watanabe, and H. Tominaga, "On a relationship between flicker artifacts and quantization error for Motion JPEG2000," in *Proc. FIT*2003, *J*-039, September 2003 that temporal flickering is a result of temporal changes in the quantization. In particular, for the case of JPEG2000, it is a result of the post-compression quantization. In A. Becker, W. Chan, and D. Poulouin, "Flicker reduction in intraframe codecs," in *Proc. IEEE Data Compression Conference*, March 2004, pp. 252-261, it was noted that temporal flickering can result if temporally collocated JPEG2000 code-blocks, corresponding to almost identical content in subsequent frames, are inconsistently quantized. Past work that has identified inconsistent or poorly done quantization across subsequent frames as a source of the temporal flickering artifact.

The approach presented in X. Fan, W. Gao, Y. Lu, and D. Zhao, "Flicking reduction in all intra frame coding," Joint Video Team of ISO/IEC MPEG and ITU-T VCEG, JVT-E070, October 2002 addresses flickering due to quantization in H.264/AVC-based codecs when only intra-coding is used. It also proposed a simple but intuitive metric for measuring the flickering artifact. The discussion below uses the notation introduced so far. Tilde denotes compressed and reconstructed values. The following simple notation is defined for a sum of squared differences over all pixels (j,i) of a block b in a frame F as shown in Eq. 12 below $$SSD(\alpha, \beta, b) = \sum_{(j,i) \in b} (\alpha(j, i) - \beta(j, i))^2 \quad \text{Eq. 12}$$

The metric was defined as shown in Eq. 13 below:

$$f - norm = \sum_{(t,b), SSD(\tilde{p}(t), p(t+1), b) < \varepsilon} SSD(\tilde{p}(t+1) - \tilde{p}(t), p(t+1) - p(t)) \quad \text{Eq. 13}$$

It is noted that only blocks, for which a constraint on the maximum sum of squared differences of the block pixel values in the current frame and the pixel values in the next frame is satisfied, are considered in the metric calculation. The main metric calculates the difference between the temporal squared differences of the original and reconstructed pixel values. It was shown in A. Leontaris, Y. Tonomura, T. Nakachi, and P. C. Cosman, "Flicker Suppression in JPEG2000 using Segmentation-based Adjustment of Block Truncation Lengths," in *Proc. IEEE International Conference on Acoustics, Speech, and Signal Processing*, Honolulu, Hi., Apr. 15-20, 2007 that the above metric performs well. The work in X. Fan, et al., "Flicking reduction in all intra frame coding" (cited above), showed using the above metric that temporal flicker increases as a result of the spatial intra prediction in H.264/AVC. The proposed solution in X. Fan, et al., "Flicking reduction in all intra frame coding," uses a quantized version of the original prediction to perform spatial intra prediction.

A method proposed in S. Sakaida, K. Iguchi, S. Gohshi, and Y. Fujita, "Adaptive quantization control for reducing flicker of AVC/H.264 intra frames," in *Proc. Picture Coding Symposium*, December 2004 optimized coding mode decisions by minimizing a Lagrangian cost that took into account the flickering distortion $D_F$. The cost can be written as shown in Eq. 14:

$$J = D + \mu \times D_F + \lambda \times R \quad \text{Eq. 14}$$

The flickering distortion was calculated similar to X. Fan, et al., "Flicking reduction in all intra frame coding". Apart from optimizing the selection of the coding mode, S. Sakaida, K. Iguchi, S. Gohshi, and Y. Fujita in "Adaptive quantization control for reducing flicker of AVC/H.264 intra frames" also proposed a selection scheme for the quantization parameter. After the reconstruction of the current macroblock, the sum of absolute differences between the previous intra block and the current reconstructed intra block is calculated. If it is less than a threshold value, the coding of this macroblock is complete. Otherwise, the quantization parameter is decreased (the quantization becomes finer) and the above process is repeated.

An approach that uses post-processing to blend decoded frames with motion-compensated versions of previously decoded frames is discussed in Y. Kuszpet, D. Kletsel, Y. Moshe, and A. Levy, "Post-Processing for Flicker Reduction in H.264/AVC," *Proc. of the 16th Picture Coding Symposium (PCS 2007)*, Lisbon, Portugal, November 2007. This approach is mainly targeted at reducing flicker due to periodic intra-coded frames. Another approach with the same objective but a different methodology is presented in K. Chono, Y. Senda, and Y. Miyamoto, "Detented Quantization to Suppress Flicker Artifacts in Periodically Inserted Intra-Coded Pictures in H.264 Video Coding," in *Proc. IEEE International Conference on Image Processing*, October 2006, pp. 1713-1716. The method is called "detented" quantization and comprises first deriving a motion-compensated (inter-coded) version of the frame that will be coded as intra, obtaining quantization levels for each reconstructed value of the inter-coded frame, and then using those levels to constrain the quantized values of the intra-predicted residuals so that the error patterns stay consistent.

The methods and systems discussed above address spatial and/or temporal flickering with either only limited improvements in the quality of compressed video and/or high processing overhead to achieve desired improvements. Therefore, there exists a need in the art to address the problem of spatial and temporal flickering that is a result of coding mode and quantization decisions at the encoder to provide for improvements in spatial and temporal perceptual quality of compressed video.

BRIEF DESCRIPTION OF THE DRAWINGS

FIG. 3 depicts macroblock and sub-macroblock partitions in the H.264/AVC video coding standard.

FIG. 4 illustrates intra-prediction modes for 4×4 blocks.

FIG. 5A illustrates 4×4 intraprediction within H.264/AVC showing the pixels used for prediction. FIG. 5B illustrates 4×4 intraprediction within H.264/AVC showing the prediction direction.

FIG. 8A depicts an original frame with uniform Y value of 111. FIG. 8B depicts an encoded and reconstructed frame using QP 32. Contrast in FIG. 8B has been stretched for visibility purposes.

FIG. 9 depicts temporal flickering as a result of quantization and inter mode decision.

FIG. 16 illustrates quantization of coefficient c.

DESCRIPTION OF EXAMPLE EMBODIMENTS

Figure 1:
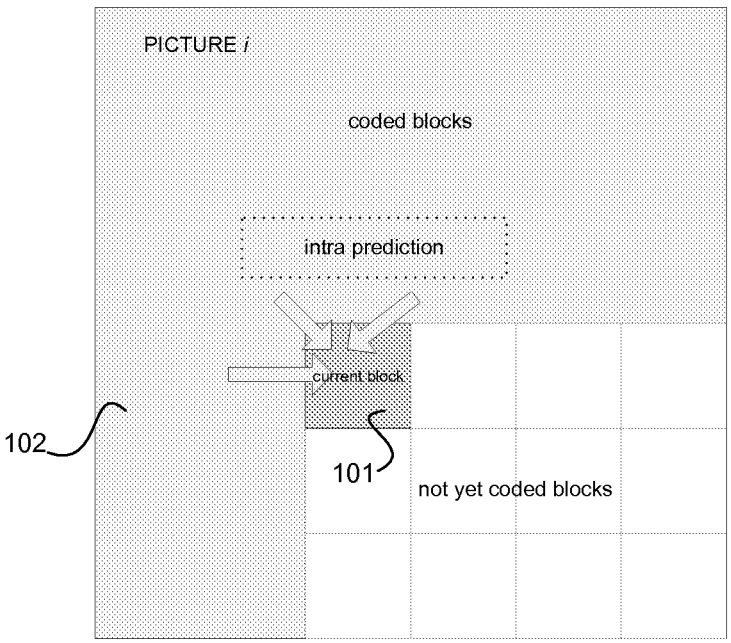
FIG. 1 depicts a generic intra predictor for an arbitrary coding order.
Figure 2:
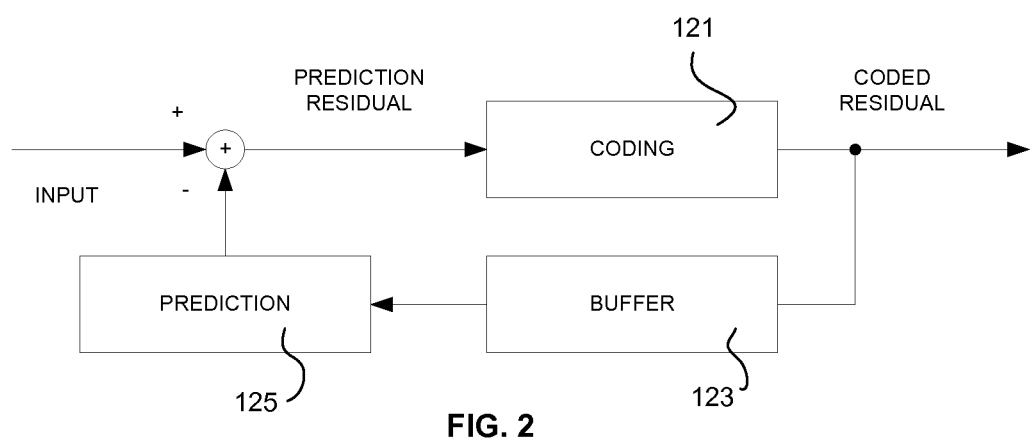
FIG. 2 is a block diagram of a generic closed-loop predictor.
Figure 6:
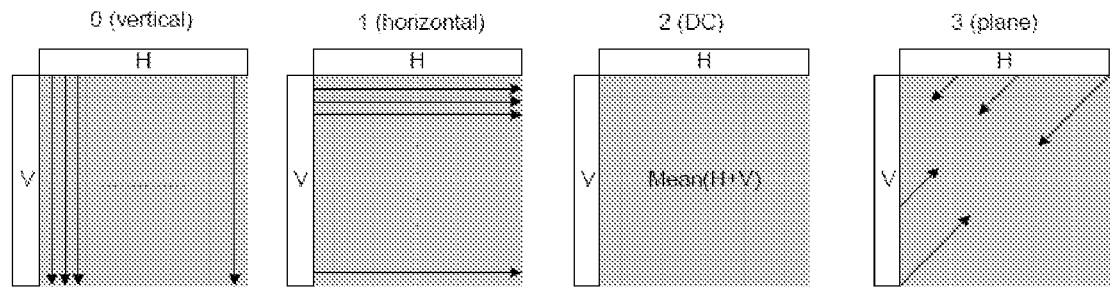
FIG. 6 illustrates intra-prediction modes for 16×16 blocks.
Figure 7:
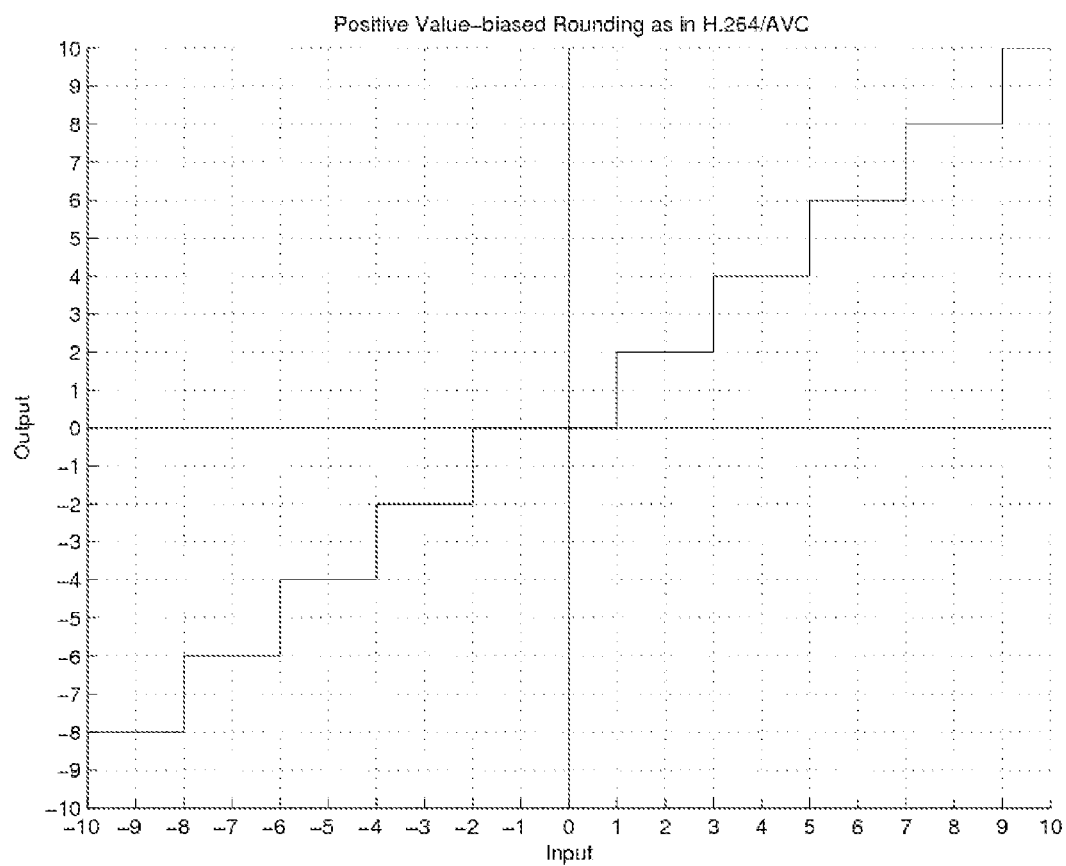
FIG. 7 illustrates asymmetry in rounding operations associated with H.264/AVC.

In the following description, for the purposes of explanation, numerous specific details are set forth in order to provide a thorough understanding of the present invention. It will be apparent, however, that embodiments of the present invention may be practiced without these specific details. In other instances, well-known structures and devices are shown in block diagram form in order to avoid unnecessarily obscuring the present invention.

Embodiments of the present invention are described briefly immediately below and in expanded detail later in this disclosure. These embodiments are presented in a generally hierarchical fashion, where earlier described embodiments may be considered as components within later described embodiments. However, those skilled in the art will understand that, in some cases, additional embodiments of the present invention may result from portions of the later described embodiments being included with all or some portions of the earlier described embodiments.

Embodiments of the present invention may include spatial metrics that measure the impact of coding decisions for a current picture area on previously coded or predicted picture areas. Some of those metrics are based on measuring dissimilarity across blocks or regions. These spatial metrics measure the extent to which the current coded block matches its spatial neighborhood once decoded and reconstructed. It is accepted that transitions across coded blocks or pixel areas should be smooth. One such spatial metric is computed in the pixel domain across the boundaries. Another such spatial metric weighs pixels at the block boundaries with larger weighting coefficients compared to inner blocks. Still another such spatial metric calculates first the per-pixel errors and then applies a transform, such as a Hadamard transform similar to the one found in the H.264/AVC standard, on the pixel errors. The application of the transform overlaps the block boundaries. In fact, the multiple transform blocks may overlap both the block boundaries as well as each other. These spatial metrics can be further improved by adding consideration for color-space conversion-induced distortion.

With regard to temporal metrics, embodiments of the present invention may include existing metrics that measure temporal flicker to evaluate temporal flicker in compressed video and drive coding mode and quantization decisions.

An exemplary embodiment of the present invention comprises a comprehensive optimization method for coding mode decision and quantization. The method is tiered: coding mode decision is optimized first, followed by optimization of the quantization. Furthermore, the method may be applied on a picture or a block basis. Applying the method on a picture basis allows easier implementation of a dynamic programming approach to optimize coding modes and quantization within the picture.

An exemplary embodiment comprises an efficient method featuring early termination that exploits the neighborhood context for mode decision and then optimizes the quantization process using a host of techniques in addition to the metrics briefly described above.

An exemplary embodiment comprises a pre-filtering method based on previously generated lookup tables and QP values selected during rate control. The DC value of certain regions can be modified to avoid spatial and temporal artifacts.

An exemplary embodiment comprises a method for allocation of additional bits in coding the DC value of the block rather than the AC coefficients. Doing so may improve the spatial and temporal perceptual quality of the compressed video.

These exemplary embodiments are now described in additional detail below.

As described above, spatial and temporal flickering may result from coding mode and quantization decisions at the encoder. Spatial artifacts can be addressed provided there is a way to measure and quantify them. The measurement of the artifacts can be then used to drive coding decisions that may minimize or diminish them. A traditional block-based spatial distortion metric is the sum of squared errors as shown in Eq. 6 (shown above). Let $\tilde{p}(i,j,t)$ denote the reconstructed value (after decoding) of pixel $p(i,j,t)$. That norm can be generalized to a p-norm for a pixel region b as shown below in Eq. 15:

$$norm_p = \left(\sum_{(j,i)\in b} |p(j, i, t) - \tilde{p}(j, i, t)|\right)^{\frac{1}{p}}$$ Eq. 15

By taking special cases of p, $norm_1$ is derived as equal to the sum of absolute differences, while $(norm_2)^2$ is equal to the sum of squared errors of Eq. 6. For larger values of p, one can obtain higher order metrics with different (and sometimes desirable) properties. A variation of $norm_p$ is defined where the errors are weighted according to their position in the pixel area. Let $b_{ext}$ denote the set of coordinates of area b that are located on the outer perimeter of b. Let $b_{int}$ denote the set of coordinates of area b that belong to b but do not include the coordinates in $b_{ext}$. Let $w_{ext}$ denote a non-negative weight. Let $w_{int}$ denote a non-negative weight such that $w_{int} < w_{ext}$. That generalized metric may be presented as shown in Eq. 16 below:

$$w\text{-}norm_p = \left(\begin{array}{l} w_{ext} \times \sum_{(j,i)\in b_{ext}} |p(j,i,t) - \tilde{p}(j,i,t)|^p + \\ w_{int} \times \sum_{(j,i)\in b_{int}} |p(j,i,t) - \tilde{p}(j,i,t)|^p \end{array}\right)^{\frac{1}{p}}$$ Eq. 16

An even more generalized version can be written as shown in Eq. 17 below:

$$w\text{-}norm_p = \left(\sum_{(j,i)\in b} (w(j,i) \times |p(j,i,t) - \tilde{p}(j,i,t)|^p)\right)^{\frac{1}{p}}$$ Eq. 17

Figure 10:
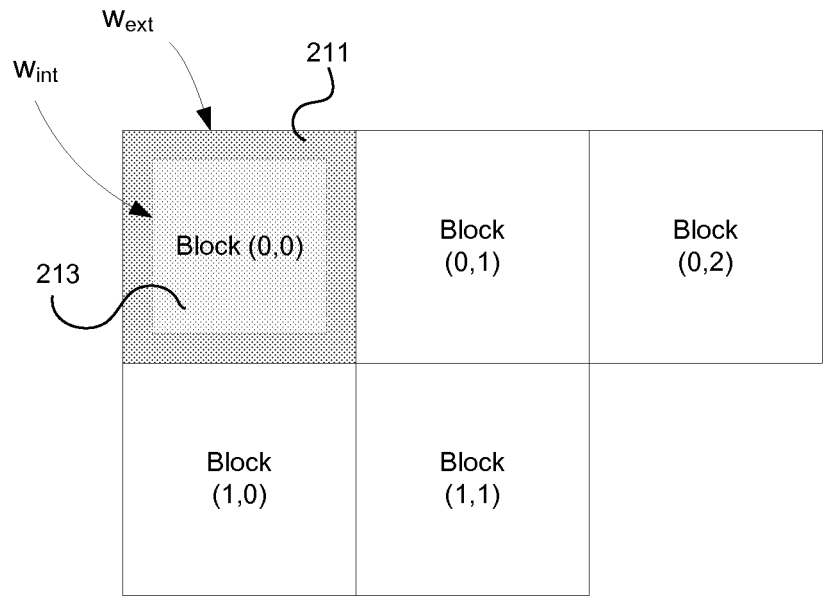
FIG. 10 depicts different weighting coefficients for pixel errors based on error location.

Terms w(j,i) are non-negative weights that take different values based on the coordinates. They are chosen such that the weights are larger for the outer perimeter of the block. A visual example of this type of metric is depicted in FIG. 10. FIG. 10 depicts the outer perimeter pixels 211 which will have larger weights than inner pixels 213. This family of metrics is based on the premise that errors close to block boundaries should be small, such that they match the neighborhood.

Another family of metrics for coding mode decision again considers the neighborhood of the current block. Similar metrics have been used before for error concealment and they are termed "block matching" metrics. Block matching metrics measure the similarity of neighboring blocks. A general definition follows. Assume that the current block b is a direct neighbor of one or more blocks that comprise a set N(b). Let (m,n)=c(j,i,N(b)) denote a function that yields the coordinates of a pixel (m,n) in a block that belongs to the neighborhood N(b) of block b and that is the closest to pixels (j,i). In general, boundary pixels in b are compared with pixels in the immediate neighbors. Preferably, the function c is designed such that (m,n) is close or the closest pixel to (j,i) given the fact that they both belong to different, but, at the same time, neighboring blocks. A generic version of the metric is written as shown in Eq. 18 below:

$$n\text{-}norm_p = \left(\sum_{(j,i)\in b} (w(j,i) \times |\tilde{p}(j,i,t) - \tilde{p}(c(j,i,N(b)),t)|^p)\right)^{\frac{1}{p}}$$ Eq. 18

Note that compared to the previously presented metrics, the above metric compares differences of reconstructed pixels and does not include the original pixel values in its calculations. This is a no-reference metric, since it does not require access to the reference (the original pixels p(i,j,t)) to determine a measure of the spatial distortion. In general, the blocks of N(b) have already been coded and reconstructed. For reasons of reduced complexity, one may wish to calculate or compute the above metric without resorting to full coding and reconstruction of the current block. This may be done by employing the predicted values of the pixels $\hat{p}$(i,j,t) as shown in Eq. 19 below:

$$n\text{-}norm_p = \left(\sum_{(j,i)\in b} (w(j,i) \times |\hat{p}(j,i,t) - \tilde{p}(c(j,i,N(b)),t)|^p)\right)^{\frac{1}{p}}$$ Eq. 19

Figure 11:
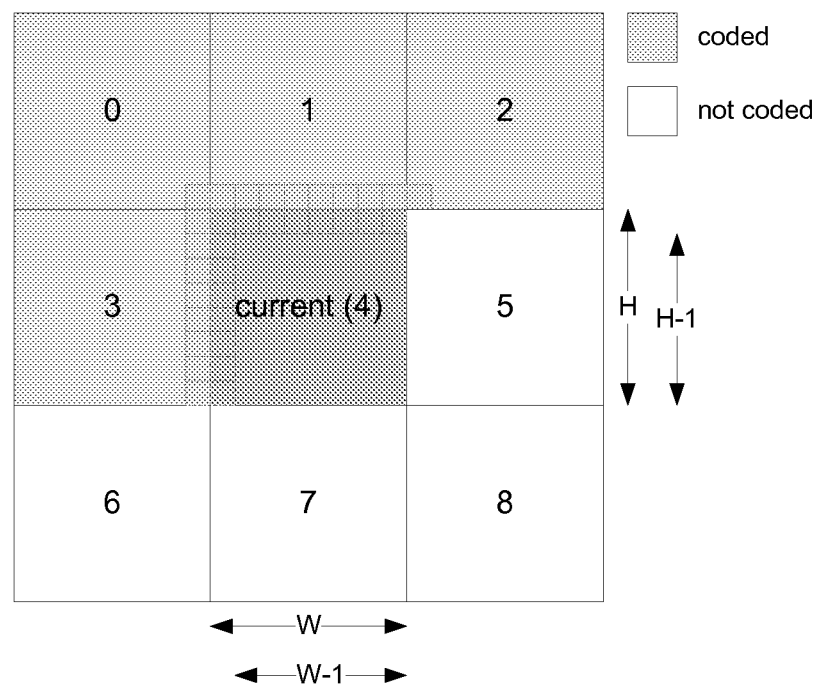
FIG. 11 depicts a spatial distortion metric that calculates differences across block boundaries.

A possible realization of the above described family of metrics is depicted in FIG. 11. Let H and W denote the height and width for a block, respectively. Let also (k,l) denote the coordinates of the left and uppermost pixel of the current block b. This particular metric is written as shown in Eq. 20 below:

$$n\text{-}norm_p = \sum_{j=0}^{H-1} |\hat{p}(j+k,l,t) - \tilde{p}(j+k,l-1,t)|^p +$$
$$\sum_{i=0}^{W-1} |\hat{p}(k,l+i,t) - \tilde{p}(k-1,l+i,t)|^p$$ Eq. 20

The above metric measures vertical similarity at the top horizontal side of the current block and horizontal similarity at the left vertical side of the current block. As depicted in FIG. 11, only blocks that have already been coded and are in the direct neighborhood of the current block contribute to the metric computation.

A third family of metrics that may be used to optimize coding mode and quantization decisions is now described in detail. This family is targeted at measuring the extent of the spatial correlation of the prediction errors or, in some other implementations, the reconstruction errors. For simplicity, the prediction error is denoted as shown in Eq. 21 below:

$$\hat{e}(j,i,t) = p(j,i,t) - \hat{p}(j,i,t)$$ Eq. 21 and the reconstruction error is as shown in Eq. 22:

$$\tilde{e}(j,i,t) = p(j,i,t) - \tilde{p}(j,i,t)$$ Eq. 22

The above two errors may also take a matrix form for the block b: $\hat{E}_b = P_b \hat{P}_b$ and $\tilde{E}_b = P_b \tilde{P}_b$. In general, prediction or reconstruction errors should be uncorrelated and spatially flat (uniform) for two important reasons: (a) the opposite means that prediction is not efficient enough and compression efficiency may suffer, and (b) correlated errors may be easier for a viewer to perceive. To measure the spatial correlation, a spatial decorrelating transform S is employed that may be applied on the prediction and/or reconstruction error (residual) matrices. The selected transform may be any de-correlating two-dimensional transform, such as the Discrete Cosine Transform, Fourier Transform, Karhunen Loeve Transform, or a Discrete Wavelet Transform, among others. For reasons of reduced complexity and practicality, the 4×4 or 8×8 Hadamard transform may be used, whose 4×4 forward transformation matrix is given below in Eq. 23:

$$H = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \qquad \text{Eq. 23}$$

It is preferred, but not required, that the size of the transform is smaller than the size of the (reconstructed or prediction) error block. Let the block be of size W×H and the decorrelating transform be of size N×N. Let $d_i$ denote a block of size N×N that either overlaps or is wholly contained within the current block b of size W×H. The index i takes values from 0 to M−1. It is constrained that at least one block of the M blocks will overlap the current block and one of its neighbors N(b), and that at least one of the M blocks will be contained within the current block b. This generalized metric can be written in two steps as follows, starting with Eq. 24 below:

$$\Theta = \sum_{i=0}^{M-1} S E_{d_i} S^t \qquad \text{Eq. 24}$$

Let $\theta_i$ denote an entry of the N×N-entry $\Theta$ matrix-form metric result. Note that the error block $E_{d_i}$ is equal either to $\hat{E}_{d_i}$ or $\tilde{E}_{d_i}$. Matrix $S^t$ is the transpose or inverse of matrix S. The end form of the metric comprises a linear or non-linear combination of the entries of the $\Theta$ matrix. A possible embodiment of the metric $\theta$-norm is given as shown in Eq. 25:

$$\theta - norm = \sum_{i=0}^{N^2} \theta_i \qquad \text{Eq. 25}$$

Figure 12:
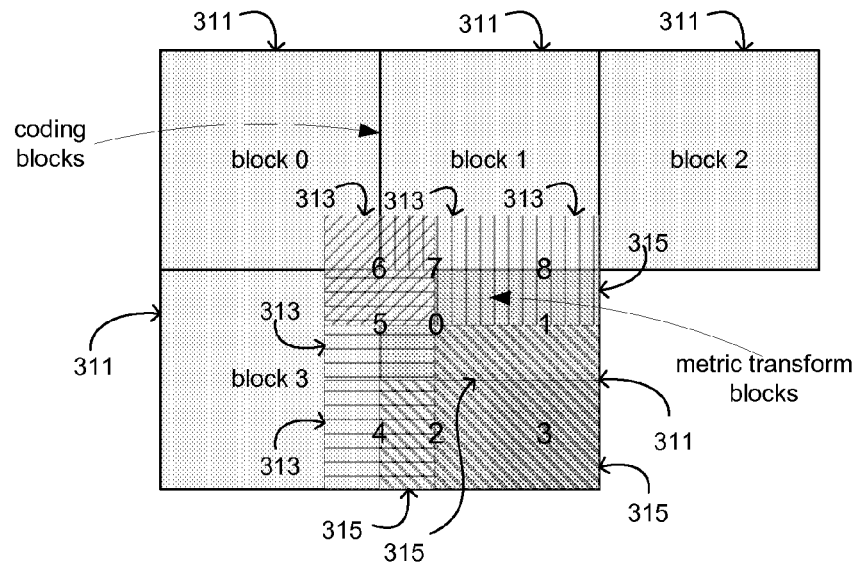
FIG. 12 depicts an example of the application of spatial transforms on pixel error blocks to yield a spatial distortion metric.

Alternatively, the above summation could involve the squares or the absolute values of the transformed errors, or even some non-linear combination of those errors. An illustration of an embodiment of the above metric is depicted in FIG. 12. For the illustrated example, assume N=4 and W=H=8. FIG. 12 depicts an assembly of coding blocks 311 shown as block 0 through block 4. Also in FIG. 12, internal transform blocks 315 are positioned above coding block 4 and overlapping transform blocks 313 are positioned to overlap coding block 4 and adjacent coding blocks. Transform blocks 0 through 3 cover the entire current coding block 4. These transform blocks do not overlap each other or neighboring blocks. In an alternative implementation, one could add an overlapping transform block to potentially improve the metric's performance. Transform blocks 4 and 5 do not overlap each other but overlap the current coding block and its neighboring coding block 3. Similarly, transform blocks 7 and 8 do not overlap each other but overlap the current coding block and its neighboring coding block 1. Last, transform block 6 overlaps four coding blocks: blocks 0, 1, 3, and 4. The goal of such a placement is to measure distortion introduced between multiple coding blocks so that the newly coded block matches its neighborhood.

The above metric can also be extended in the third dimension: the temporal axis. A decorrelating transform $S_t$ may be applied along the temporal axis. The transform may be applied on the prediction errors or the reconstruction errors are defined earlier. Assuming the transform has a length of 4, such as Hadamard transform of length-4 H, four samples are needed in order to apply the one-dimensional temporal transform. Sample 0 is obviously either $\hat{e}(j,i,t)$ or $\tilde{e}(j,i,t)$. While the four previous samples can be the collocated values $\hat{e}(j,i,t-1)$, $\hat{e}(j,i,t-2)$, and $\hat{e}(j,i,t-3)$, this will not be optimal. Optimally, the coordinates are derived such that the object position is traced along the frame trajectory. In hybrid video codecs, this can be easily done since the motion vectors used to code the previous frames are known. Using those motion vectors, one can derive the approximate coordinates of pixel (j,i) in frame t, in frames t−1, t−2, and t−3. For simplicity, these derived coordinates for a given frame t−k are denoted as $(j_{t,t-k}, i_{t,t-k})$. For an arbitrary temporal transform length of T, the vector sample can be written as shown in Eq. 26:

$$\hat{E}(j,i,t) = [\hat{e}(j,i,t)\hat{e}(j_{t,t-1},i_{t,t-1},t-1) \ldots \hat{e}(j_{t,t-T+1},i_{t,t-T+1},t-T+1)] \qquad \text{Eq. 26}$$

After application of the transform $S_t$, $\Theta_t(j,i,t) = S_t \hat{E}^T(j,i,t)$ is obtained. Next, the coefficients in the temporal axis are combined: either through some weighted linear addition, or some non-linear combination. The resulting two-dimensional matrix with coefficients $\Theta_t = [\Theta_t(j,i)]$ can be used with the spatial overlapping metric by using it as the input in place of $\hat{E}_b$ or $\tilde{E}_b = P_b - \tilde{P}_b$. The resulting complete metric will thus measure error inconsistency in both the spatial and temporal domain through the addition of a temporal transform and motion tracking/threading.

Presented above are examples of spatial distortion metrics that may be used to optimizing coding decisions within a picture. The former two are based on well-known techniques while the latter one is a novel approach based on quantifying the perceptual effect of spatial distortion.

Figure 19:
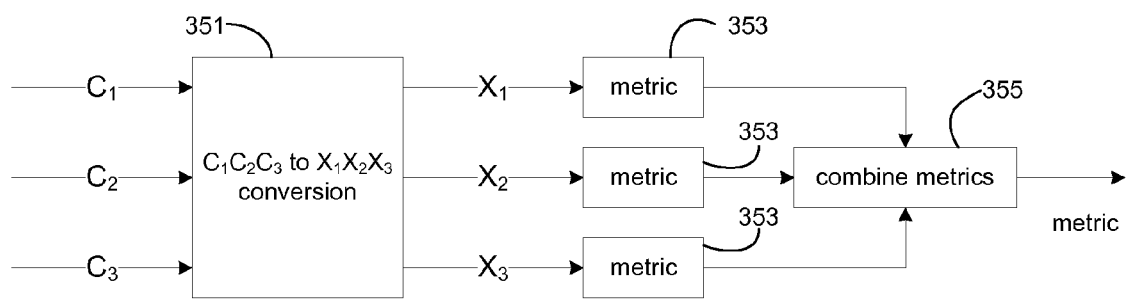
FIG. 19 depicts color-space conversion prior to application of described metrics.

The metrics discussed above may be augmented by accounting for the effect of color space conversions. Color-space conversions are transformations that are applied on the color-component triplets to convert parameters from one color space to another, e.g. from RGB to YUV. These transforms can be lossy and may introduce additional errors: e.g. a conversion of a YUV triplet to RGB and then its conversion back to YUV may yield values that are not identical to the original ones. Even if the transformations are lossless, leading to perfect reconstruction, there is still the issue of errors in components of one space that may either be magnified or attenuated when converting to the output color-space, say RGB. Therefore, there is an option of adding a module to the previously described metrics that converts input pixel values from their color-space to the one that will be likely used for display, and calculating the errors in that domain. In that case, the overall metric will be a weighted average of the metrics for all three components. A diagram of this method is depicted in FIG. 19. As depicted in FIG. 19, the color conversion 351 is performed. Metric calculation 353 is then performed for each color component. Metric combination 355 is then performed to determine the spatial and/or temporal characteristics of the picture or block.

A detailed discussion of coding mode decision and quantization optimization methods according to embodiments of the present invention follows below.

A first exemplary embodiment optimizes coding mode decisions and quantization to achieve the best possible perceptual quality. This embodiment is targeted for coding optimization within a picture. Assume that the current block is being coded. A rate control module yields some initial coding parameters (e.g. a quantization parameter). First, the quantization strategy is fixed. This is equivalent to fixing the quantization parameter, the quantization matrix, and the quantization offsets, among others. The method seeks to find the optimal intra or inter coding mode given a fixed quantization strategy. This optimization problem may be solved with a number of methods. These methods include but are not limited to:
  (a) Lagrangian minimization of a rate-distortion cost. The distortion metric may be one of the previously mentioned metrics that measure inter-block similarity. Furthermore, it may be a metric that also measures temporal artifacts. The decision for a block is taken without consideration of its future impact.
  (b) Selection of the coding mode through dynamic programming to exploit the inter-dependencies of inter and intra coding modes. Spatial intra prediction uses samples from previously coded blocks. In addition, inter prediction predicts motion and illumination change parameters from neighboring blocks. As a result, the decision to use a certain coding mode will impact the coding performance of future coding modes. Dynamic programming can solve this problem to obtain the coding mode allocation for the entire picture. Dynamic programming solves the problem using a trellis with several transitions. The states depend on the context: the coding modes used by the neighborhood of the current block. The transitions correspond to selections of different coding modes for the current block. The cost for each transition is calculated or computed, for example, as a Lagrangian cost as in the previous case. The distortion metric may be one of the previously mentioned metrics that measure inter-block similarity. Furthermore, it may be a metric that also measures temporal artifacts.

Method (a) can solve the problem of coding mode decision on a block basis, while Method (b) will solve the problem for the entire picture. After the coding mode for the current block or the coding modes for the current picture have been determined, the coding mode selections are fixed and the quantization process is optimized for each block. Similarly as above, the optimization can be done on a block basis without consideration of the future impact of quantization decisions, or alternatively, on a picture basis through consideration of dynamic programming. The states in the trellis columns or the context that affects the calculation of metrics used to optimize quantization may be one of the following:
  (a) Quantization parameters used to code the block;
  (b) Reconstructed average DC values of the blocks; or
  (c) Quantization strategy for the block: DC coefficient quantized to the upper or lower value.

The transitions in the trellis or the quantization options during the block-based optimization may represent one or more (combinations) of:
  (a) Using a different quantization parameter or quantization step size to perform quantization;
  (b) Applying a different quantization offset during quantization in conjunction with adaptive rounding;
  (c) Switching among available quantization matrices (e.g. for High Profile and above); and
  (d) Switching between positive-biased (upper value) or negative-biased quantization (lower value) for DC values of blocks.

Figure 17:
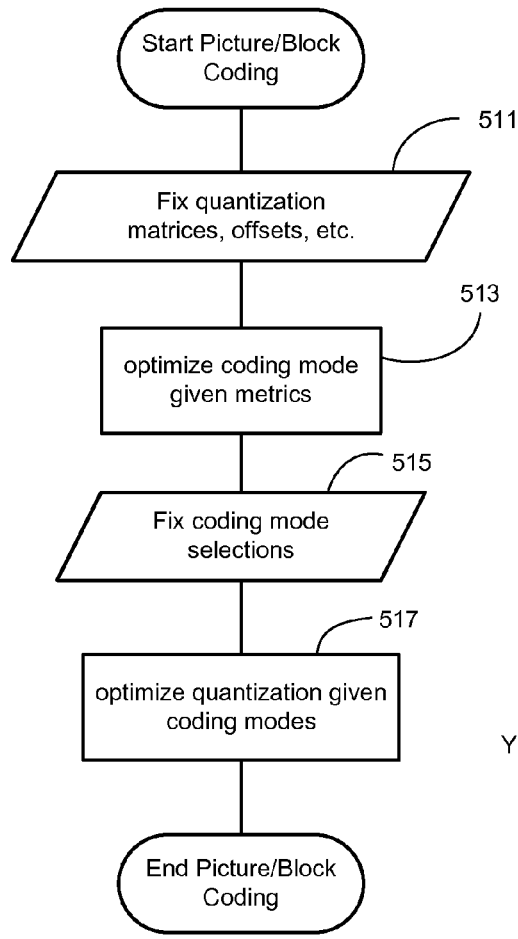
FIG. 17 is a flowchart of a coding mode and quantization optimization method with spatio-temporal perceptual quality considerations.

Furthermore, quantization can be improved in a more granular fashion within the block itself through the use of trellis-based quantization. Again, such trellis optimization scheme should use metrics that measure inter-block and temporal similarity. A flow-chart of the generic algorithm is depicted in FIG. 17. As depicted in FIG. 17, a quantization strategy step 511 is performed to fix, for example, the quantization parameter, quantization matrix, quantization offsets, and other quantization-related information. A code optimization step 513 is performed to optimize the coding mode based upon the calculated metrics. A coding mode selection step 515 is performed to fix the coding mode or modes to be used for coding the picture or blocks of the picture. A quantization optimization step 517 is performed to select an optimal optimization based upon the selected coding modes. The picture or block is then coded with the selected coding modes and optimization.

Figure 18:
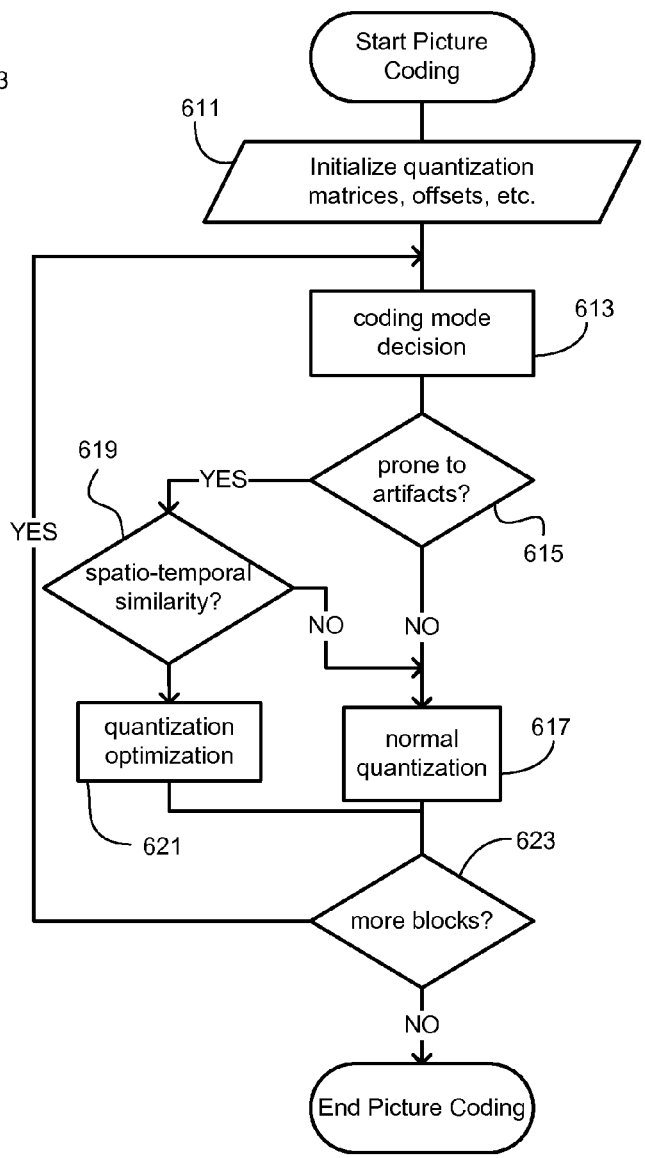
FIG. 18 is a flowchart of a low-complexity two-tiered mode decision and quantization optimization method.

A second exemplary embodiment adopts a low complexity methodology that avoids trellis-based optimization (dynamic programming) and employs early termination to reduce calculations. FIG. 18 depicts a flow chart of this exemplary embodiment. Initially, a quantization initialization step 611 is performed to set the quantization parameter, quantization matrix, quantization offsets, and other quantization-related information. Then, coding mode decision 613 is performed, perhaps in a similar way to Method (a) of the first embodiment discussed above, which may employ one or more of the inter-block similarity metrics discussed previously. After coding mode selection 613, the coding mode is verified to establish whether it could create spatio-temporal artifacts. Intra-coded modes, such as the 16×16 intra prediction modes of H.264/AVC, can create both spatial and temporal flickering. If a decision 615 is made that it is not such a mode, then a normal low-complexity quantization process 617 is performed using some arbitrary quantization matrices and offsets. If it is a potentially problematic mode, then a decision 619 is made whether the current block shares spatial and/or temporal similarity with neighboring blocks. This can be done in a number of ways that include but are not limited to evaluating:
  (a) Reconstructed and original average DC values of the blocks,
  (b) Block variances,
  (c) Inter or intra prediction mode used to code the block,
  (d) Spatial and temporal distortion metrics of the block itself (overlapping and non-overlapping), such as those already known in the art or introduced in this disclosure. The above metrics are applicable to reconstructed, predicted, and original values of the pixel samples. They can be causal or non-causal: causal means that they only evaluate pixel samples that have already been coded and reconstructed.

If it is established that there is sufficient spatial and/or temporal similarity then, instead of the normal quantization process, a comprehensive quantization optimization framework 621 is invoked. Four methods for the quantization optimization framework are discussed below. The processing and decision steps described above are then repeated until all blocks within the picture have been processed, as shown by decision step 623.

The first method for the quantization optimization framework comprises applying available quantization parameter values and selecting the one that minimizes one of the above mentioned spatial and temporal metrics. The second method comprises applying two possible quantization offsets for the DC coefficient during forward quantization: one with a positive sign and a second one which has the same absolute value but with a negative sign. The offset that minimizes one of the spatial and temporal metrics is selected. The third method comprises applying quantization to the upper value (as explained above and illustrated in FIG. 16) and quantization to the lower reconstruction value for the DC coefficient. The reconstruction value that minimizes one of the spatial and temporal metrics is selected. A fourth method comprises coding the full DC coefficient or zeroing it out. The coefficient that minimizes one of the spatial and temporal metrics is selected. Either one or more of the above methods can be used in a parallel or serial fashion. In the parallel arrangement, all combinations of the options are evaluated and the one satisfying the metrics is selected. In the serial arrangement, the methods may be cascaded such that one may affect the other. For example, the first method may be first applied to derive a good quantization parameter value. Then the third method may be applied to select the quantization index to be transmitted given the selected quantization parameter. More combinations are possible. A flow-chart of this embodiment is depicted in FIG. 18.

Figure 13:
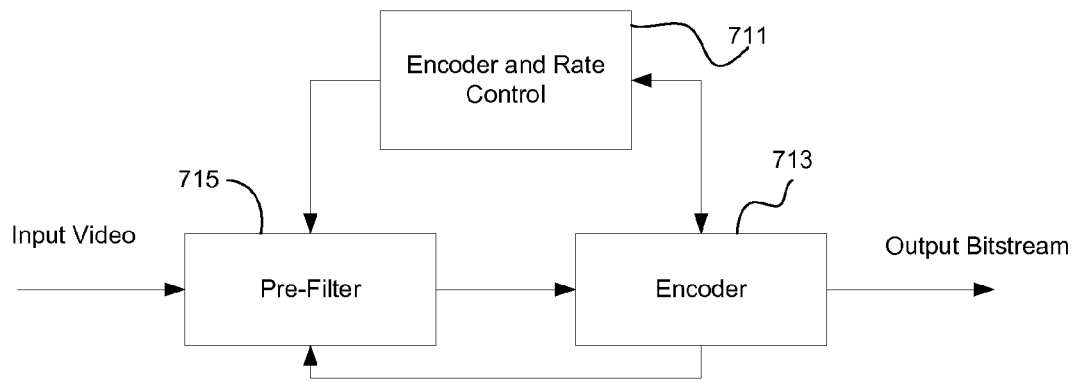
FIG. 13 is a block diagram of a method for pre-filtering with spatial and temporal quality considerations.

A third exemplary embodiment comprises a pre-filtering method that helps improve both spatial and temporal perceptual quality. This embodiment is depicted in FIG. 13. The encoder and rate control module 711 controls the coding mode decision and quantization components within the video encoder 713. The rate control and encoder module 711 receives information from the encoder 713 and issues instructions to both the encoder 713 and the pre-filter module 715. The input video is first passed through a pre-filtering module 715 and is then fed to the video encoder 713. The video encoder 713 may optionally feed back reconstructed frames back to the pre-filter 715. The pre-filter module 715 can be simple or complex. A simple version of the pre-filter 715 consists of a component that adds some fixed value to some subset of the input pixels or applies a spatial filtering process with some low-pass, band-pass, or high-pass spatial filter. A more complex version of the pre-filter 715 may involve temporal-filtering, such as averaging the current picture with a previously processed or coded one. Even more complex versions of the pre-filter 715 may involve motion-compensated processing of original input pictures or previously reconstructed frames that were fed back from the video encoder as described in additional detail below.

A. Leontaris and A. M. Tourapis in "Drift Characterization of Intra Prediction and Quantization in H.264", in *Proc. Data Compression Conference*, March 2008, showed that certain combinations of average block values (DCs) and quantization parameters may lead to substantial perceptual problems in the compressed video. The information about these combinations may be derived in advance prior to coding the input video. Furthermore, apart from the quantization parameters, the combinations may also be derived with respect (conditioned) to the quantization offsets and quantization matrices, as well as other coding parameters such as the strength of the loop filter in H.264/AVC. They may also be conditioned with respect to the coding mode. It is possible to extend the conclusions of A. Leontaris and A. M. Tourapis in "Drift Characterization of Intra Prediction and Quantization in H.264" to temporal artifacts by again simulating combinations of coding modes, quantization parameters, and DC values for blocks or areas. For example, the combinations of modes, DCs, and quantization that give rise to the problems depicted in FIG. 9 may be simulated in advance to build a database for temporal coding artifacts as was partly addressed for the spatial domain in A. Leontaris and A. M. Tourapis in "Drift Characterization of Intra Prediction and Quantization in H.264".

The method described below may be used for pre-filtering in the embodiment depicted in FIG. 13. When a new frame is input to the encoder 713 to be coded, the encoder and rate control module 711 first determines a set of coding parameters for the frame, such as the quantization parameter. These coding parameters, together with spatial and temporal statistics of the input frame are evaluated to determine whether their combination may produce undesirable spatial and/or temporal artifacts. The spatial and temporal characteristics that may be evaluated include and are not limited to:

(a) Quantization parameters used to code the block
(b) Reconstructed and original average DC values of the blocks
(c) Block variances
(d) Inter or intra prediction mode used to code the block
(e) Quantization strategy for the block: DC coefficient quantized to the upper or lower value
(f) Spatial and temporal distortion metric of the block itself (overlapping and non-overlapping), such as those already known in the art or introduced in this disclosure.

Figure 14:
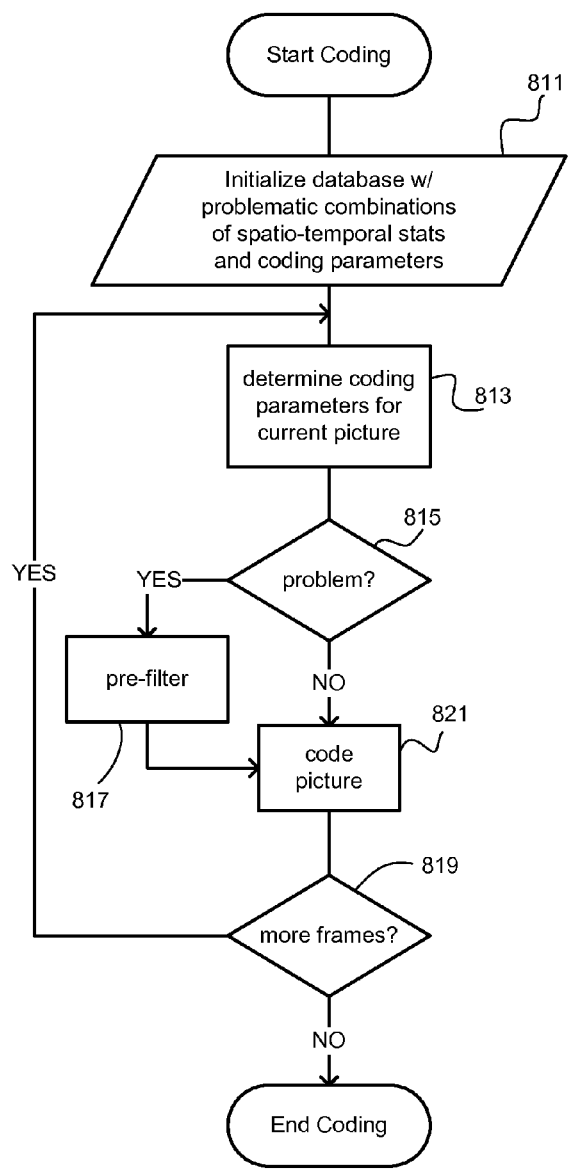
FIG. 14 is a flowchart of a method for pre-filtering with spatial and temporal quality considerations.

If the combinations are found to produce those artifacts then the encoder and rate control module 711 issues commands to the pre-filter 715 to take measures to avoid these impending problems. The measures may include the following:

(a) Modification of the DC value of a block or blocks (or a block and its neighborhood) through (preferably) addition or multiplication
(b) Blending of blocks in the current frame with collocated or motion-compensated prediction blocks drawn from past or future pictures
(c) Application of noise, either random-generated with a specific random distribution or noise that is correlated to itself or the content A flowchart of the third exemplary embodiment is depicted in FIG. 14. As depicted in FIG. 14, a database creation step 811 provides a database of spatio-temporal statistics and coding parameters that may result in perceptual problems with images. A coding step 813 determines the coding parameters for the current picture. A decision step 815 access the created database to determine if there may be an issue with the selected coding. If the determination is made that there will be no problem, the picture is coded with the selected coding in a coding step 821. If the determination is made that there may be a problem, a pre-filtering step 817 is performed, as discussed above. Then the coding step 821 is performed. The process continues until all frames are processes, as shown by decision step 819.

Note that the flowchart depicted in FIG. 14 depicts the operation on a picture basis. Besides operating on a picture basis, the embodiment can also be applied on a more granular fashion, on a block or region basis. Hence, the method determines the coding parameters for the current block and then checks if the combination is problematic. If it is found to be so, it then pre-filters that block so as to avoid these problems and then proceeds to coding the block. Still, pre-filtering and coding on a block basis may create additional artifacts. A more comprehensive approach may first simulate coding the entire picture and detect those blocks or regions that may contribute to spatial or temporal artifacts. These regions are marked and the pre-filter is applied once for the entire picture and filters/modifies those areas. Then the encoder module is called and compresses the pre-filtered picture.

Figure 15:
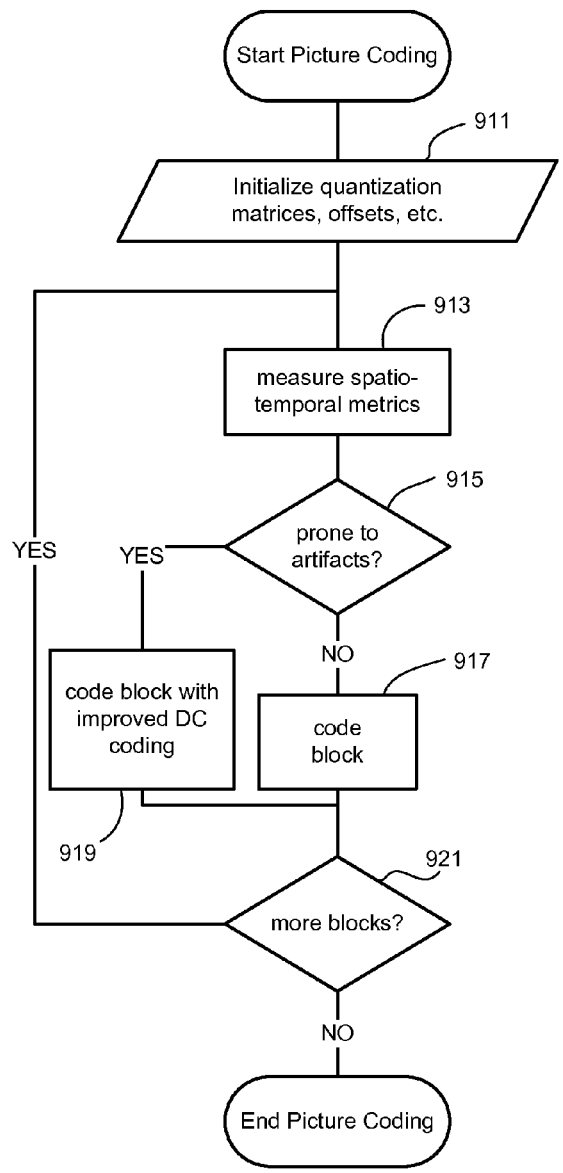
FIG. 15 is a flowchart of improved coding for transform DC coefficients in the presence of spatio-temporal artifacts.

A fourth exemplary embodiment comprises a method for allocation of additional bits in coding the DC value of the block rather than the AC coefficients. This allocation of additional bits may improve the spatial and temporal perceptual quality of the compressed video. It has been established that flicker becomes more prominent in static and relatively flat areas. Flickering is manifested as a spatial and/or temporal variation of the average DC value of an originally visually consistent region. This embodiment first establishes whether the current block or region is prone to creating spatial or temporal flickering. This may be done by using spatial and temporal metrics such as those described or introduced in this disclosure. Allocation of extra resources to coding the DC coefficients compared to resources allocated to the AC coefficients is possible through a variety of methods that include but are not limited to:

(a) Transmitting costly DC coefficients, while AC coefficients are compressed more aggressively: quantization is biased towards zero for AC coefficients or equivalently the dead-zone for the AC coefficients is larger than that for the DC coefficients (b) Given a dynamic programming framework (trellis-based optimization) for transform coefficient quantization, one can increase the significance of the DC coefficients by assigning different costs. For example, if the cost minimized during the optimization is a Lagrangian rate-distortion cost, then the Lagrangian lambda parameter for the DC coefficients can be smaller than that for the AC coefficients. Doing so will diminish the impact of rate usage in coding decisions for DC coefficients and will thus ensure lower, on average, distortion compared to the compressed AC coefficients (c) Switching to quantization matrices that do a better job quantizing DC coefficients than AC coefficients (d) Investing more computational resources towards coding the DC coefficient through testing the impact of multiple reconstruction values for the DC coefficient to spatio-temporal neighbors of the block FIG. 15 depicts a flowchart for implementing the embodiment described above. Similar to the embodiment depicted in FIG. 18, a quantization initialization step 911 is performed to set the quantization parameter, quantization matrix, quantization offsets, and other quantization-related information. Then, a spatio-temporal measurement step 913 is performed on the picture block. A decision step 915 is performed to determine whether the picture or picture block is prone to undesirable spatio-temporal artifacts. If not, a coding step 917 is used to code the block. If it is determined that spatio-temporal artifacts may be present, an enhanced coding step 919 is used to code the block with improved DC coding, as described above. The process continues until all blocks have been coded, as shown by the decision step 921.

Note that all spatial and temporal metrics discussed above and other metrics that those skilled in the art would understand to be within the teachings above may be considered for distortion calculation for applications that employ rate-distortion optimized Lagrangian Minimization for coding decisions optimization.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. In particular it is to be understood that the disclosures are not limited to particular compositions or biological systems, which can, of course, vary. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. It is also to be understood that the terminology used herein is for the purpose of describing particular embodiments only, and is not intended to be limiting. Reference to a claim element in the singular is not intended to mean "one and only one" unless explicitly so stated. As used in this specification and the appended claims, the singular forms "a," "an," and "the" include plural referents unless the content clearly dictates otherwise. The term "several" includes two or more referents unless the content clearly dictates otherwise. Unless defined otherwise, all technical and scientific terms used herein have the same meaning as commonly understood by one of ordinary skill in the art to which the disclosure pertains.

Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

A number of embodiments of the disclosure have been described. Nevertheless, it will be understood that various modifications may be made without departing from the spirit and scope of the present disclosure. Accordingly, other embodiments are within the scope of the claims presented in this disclosure.

ENUMERATED EXAMPLES EMBODIMENTS, EQUIVALENTS, EXTENSIONS, ALTERNATIVES AND MISCELLANEOUS

Accordingly, the invention may be embodied in any of the forms described herein, including, but not limited to the following Enumerated Example Embodiments (EEEs) which described structure, features, and functionality of some portions of the present invention:

(EEE1.) A method for reducing artifacts in coded pictures comprising:
  computing one or more sets of metrics for a picture, wherein each set of metrics are computed based on applying one or more different coding methods;
  selecting one or more coding methods from the applied one or more different coding methods, wherein selection of the one or more coding methods is based on the computed one or more sets of metrics; and
  coding the picture with the selected one or more coding methods.

(EEE2.) The method according to EEE 1, wherein the picture comprises a plurality of picture blocks and computing one or more sets of metrics for the picture comprises computing metrics for one or more of the picture blocks.

(EEE3.) The method according to EEE 2, wherein computing one or more sets of metrics for the picture comprises comparing pixels located at or near a perimeter of a block to pixels located at inner portions of a block.

(EEE4.) The method according to EEE 2, wherein computing one or more sets of metrics for the picture comprises comparing pixels located at or near a boundary of a picture block to pixels located at or near boundaries of one or more adjacent picture blocks.

(EEE5.) The method according to EEE 2, wherein each picture block has a block boundary and computing one or more sets of metrics for the picture comprises computing prediction errors for pixels of a picture block and applying a transform to the computed prediction errors, wherein the transform overlaps one or more block boundaries.

(EEE6.) The method according to EEE 5, wherein the prediction errors are computed for both spatial and temporal dimensions.

(EEE7.) The method according to EEE 1, wherein computing one or more sets of metrics for a picture comprises computing metrics for each component of a color signal.

(EEE8.) The method according to EEE 1, wherein the picture comprises one or more picture blocks and the method further comprises:
fixing a quantization strategy prior to computing one or more sets of metrics for a picture;
optimizing the one or more coding methods based on the computed one or more sets of metrics;
fixing the one or more coding methods selection; and,
optimizing the quantization strategy for each picture block based on the fixed one or more coding methods selection prior to coding the picture.

(EEE9.) The method according to EEE 8, wherein selecting one or more coding methods comprises performing a Lagrangian minimization of spatial or temporal distortion metrics for each picture block.

(EEE10.) The method according to EEE 8, wherein selecting one or more coding methods comprises selecting a coding mode allocation for the picture in its entirety.

(EEE11.) The method according to EEE 1, wherein the picture comprises one or more picture blocks and the method further comprises:
selecting initial quantization parameters prior to computing metrics for the picture, and
selecting one or more coding methods based on the computed metrics comprises:
selecting one or more coding modes;
checking the selected one or more coding modes to determine if the one or more selected coding modes can create spatio-temporal artifacts;
if the selected one or more coding modes do not create spatio-temporal artifacts, applying a quantization process with selected quantization matrices and offsets as part of the coding method;
if the selected one or more coding modes can create spatio-temporal artifacts, checking whether a current picture block has spatio-temporal similarity with adjacent picture blocks;
if the current picture block does not have spatio-temporal similarity with adjacent picture blocks, applying a quantization process with selected quantization matrices and offsets as part of the coding method; and
if the current picture block has spatio-temporal similarity with adjacent picture blocks, applying an optimized quantization process as part of the coding method, whereby the optimized quantization reduces spatial artifacts or temporal artifacts or spatial and temporal artifacts.

(EEE12.) The method according to EEE 11, wherein checking whether a current picture block has spatio-temporal similarity with adjacent picture blocks comprises evaluating reconstructed and original average DC values of the current block and adjacent picture blocks.

(EEE13.) The method according to EEE 11, wherein checking whether a current picture block has spatio-temporal similarity with adjacent picture blocks comprises evaluating block variances of the current picture block and adjacent picture blocks.

(EEE14.) The method according to EEE 11, wherein checking whether a current picture block has spatio-temporal similarity with adjacent picture blocks comprises evaluating inter or intra prediction modes used to code the current picture block.

(EEE15.) The method according to EEE 11, wherein checking whether a current picture block has spatio-temporal similarity with adjacent picture blocks comprises evaluating spatial and temporal distortion metrics of the current picture block and adjacent picture blocks.

(EEE16.) The method according to EEE 11, wherein the optimized quantization process comprises applying several selected quantization parameters, measuring spatial and temporal metrics resulting from the application of each of the several selected quantization parameters, and selecting quantization parameters that provide minimum spatial metrics, minimum temporal metrics, or minimum spatial and temporal metrics.

(EEE17.) The method according to EEE 11, wherein the optimized quantization process comprises applying two selected quantization offsets for a DC coefficient, measuring spatial and temporal metrics resulting from the application of each of the two quantization offsets, and selecting quantization parameters that provide minimum spatial metrics, minimum temporal metrics, or minimum spatial and temporal metrics.

(EEE18.) The method according to EEE 11, wherein the optimized quantization process comprises applying quantization to an upper reconstruction value and a lower reconstruction value, measuring spatial and temporal metrics resulting from the application of the upper reconstruction value and lower reconstruction value, and selecting the reconstruction value that provides minimum spatial metrics, minimum temporal metrics, or minimum spatial and temporal metrics.

(EEE19.) The method according to EEE 11, wherein the optimized quantization process comprises coding a full DC coefficient and zeroing out a DC coefficient, measuring spatial and temporal metrics resulting from the application of the full DC coefficient and the zeroed out DC coefficient, and selecting the DC coefficient that provides minimum spatial metrics, minimum temporal metrics, or minimum spatial and temporal metrics.

(EEE20.) The method according to EEE 1, wherein the method further comprises creating a database of spatio-temporal statistics and coding parameters that result in image artifacts and wherein selecting one or more coding methods based on the computed metrics comprises:
selecting coding parameters for the picture;
determining if the coding parameters cause image artifacts by accessing the database;
if the coding parameters do not cause image artifacts, coding the picture with the selected coding parameters; and
if the coding parameters cause image artifacts, pre-filtering the picture and coding the pre-filtered picture with the selected coding parameters.

(EEE21.) The method according to EEE 20, wherein the picture comprises a plurality of picture blocks and pre-filtering the picture comprises modifying a DC value of one or more picture blocks by addition or multiplication.

(EEE22.) The method according to EEE 20, wherein the picture comprises a plurality of picture blocks and pre-filtering the picture comprises blending of picture blocks in a current frame with prediction picture blocks from previous or future frames.

(EEE23.) The method according to EEE 20, wherein pre-filtering the picture comprises application of correlated noise to the picture.

(EEE24.) The method according to EEE 1, wherein the picture comprises a plurality of picture blocks and the method further comprises initializing quantization parameters prior to computing metrics for the picture and selecting one or more coding methods based on the computed metrics further comprises determining whether a current picture block is prone to artifacts based on the computed metrics; and wherein coding the picture with the selected one or mode coding methods comprises:
  if the current picture block is determined not to be prone to artifacts, coding the picture block with the selected one or more coding methods;
  if the current picture block is determined to be prone to artifacts, coding the picture block with additional bits for a DC value of the picture block; and
  repeating steps of determining whether a current picture block is prone to artifacts and coding each picture block until all picture blocks in the picture are coded.

(EEE25.) A method for coding pictures in a video signal to improve video quality, the method comprising:
  fixing quantization parameters for a picture or one or more blocks of the picture in the video signal;
  computing one or more sets of metrics for the picture or one or more blocks of the picture based on the fixed quantization parameters;
  generating one or more optimized coding modes for the picture or one or more blocks of the picture based on the computed one or more sets of metrics;
  selecting one or more optimized coding modes to be used for coding the picture or one or more blocks of the picture;
  selecting optimal quantization parameters based on the selected one or more optimized coding modes; and
  coding the picture or one or more blocks of the picture with the selected one or more optimized coding modes and selected optimal quantization parameters.

(EEE26.) The method according to EEE 25, wherein the metrics comprise spatial-based metrics.

(EEE27.) The method according to EEE 26, wherein the spatial-based metrics comprise a p-norm of errors computed from differences between original pixels and reconstructed pixels after decoding in a selected pixel region.

(EEE28.) The method according to EEE 27, wherein the errors are weighted according to their position within the selected pixel region.

(EEE29.) The method according to EEE 28, wherein pixels located at outer regions of the selected pixel area are given higher weights than pixels located at inner regions of the selected pixel region.

(EEE30.) The method according to EEE 26, wherein the spatial-based metrics comprise a p-norm of errors computed from differences between reconstructed pixels in a selected pixel region and reconstructed pixels in pixel regions neighboring the selected pixel region.

(EEE31.) The method according to EEE 30 wherein the errors are weighted according to their position within the selected pixel region.

(EEE32.) The method according to EEE 26, wherein the spatial-based metrics comprise a p-norm of errors computed from differences between predicted pixels in a selected pixel region and reconstructed pixels in pixel regions neighboring the selected pixel region.

(EEE33.) The method according to EEE 32 wherein the errors are weighted according to their position within the selected pixel region.

(EEE34.) The method according to EEE 26, wherein the spatial-based metrics comprise measurements of spatial correlation of prediction errors or reconstruction errors or prediction errors and reconstruction errors.

(EEE35.) The method according to EEE 34, wherein the spatial correlation extends across block boundaries.

(EEE36.) The method according to EEE 34, wherein measurements of spatial correlation comprise application of a spatial decorrelating transform on prediction error or reconstruction error or prediction error and reconstruction error matrices.

(EEE37.) The method according to EEE 25, wherein the metrics comprise spatial-based metrics and temporal-based metrics.

(EEE38.) The method according to EEE 37 wherein the spatial-based metrics and temporal-based metrics comprise measurements of spatial correlation of prediction errors or reconstruction errors or prediction errors and reconstruction errors derived from multiple frames of the picture or blocks of the picture, wherein the multiple frames occur at different times.

(EEE39.) The method according to EEE 25, wherein the metrics are augmented for the effect of color space conversions.

(EEE40.) The method according to EEE 25, wherein selecting optimal quantization parameters comprises Lagrangian minimization of a rate-distortion cost.

(EEE41.) The method according to EEE 25, wherein generating selecting one or more optimized coding modes comprises Lagrangian minimization of a rate-distortion cost computed on a block basis.

(EEE42.) The method according to EEE 25, wherein selecting one or more optimized coding modes comprises prediction based on samples from previously coded blocks and predictions based on motion and illumination changes from neighboring blocks.

(EEE43.) The method according to EEE 25, wherein computing one or more sets of metrics comprises metrics computed based on at least one of the following parameters: quantization parameters used to code at least one block of the one or more blocks; reconstructed DC values of the one or more blocks; and DC coefficients quantized to upper or lower values for the one or more blocks.

(EEE44.) The method according to EEE 25, wherein selecting optimal quantization parameters for each block of the one or more blocks comprises one or more of the following steps:
  selecting a different quantization parameter or quantization step size for each block;
  applying a different quantization offset for each block;
  selecting a different quantization matrix for each block; and
  selecting either positive-biased or negative-biased quantization for DC values of each block.

(EEE45.) A method for coding pictures in a video signal to improve video quality, wherein
  each picture comprises one or more blocks and the method comprises:
  selecting a current block of the one or more blocks
  initializing quantization-related information;

selecting a coding mode for the current block;
determining whether the coding mode may create spatio-temporal artifacts;
if the coding mode is determined not to create spatio-temporal artifacts, applying a low-complexity quantization process;
if the coding mode is determined as creating spatio-temporal artifacts; determining whether the current block is similar to neighboring blocks;
if the current block is similar to neighboring blocks, applying a comprehensive optimization process;
if the current block is not similar to neighboring blocks, applying a low-complexity quantization process; and
coding the current block with the selected coding mode.

(EEE46.) The method according to EEE 45, wherein determining whether the current block is similar to neighboring blocks comprises evaluating reconstructed and original average DC values of the current block and neighboring blocks.

(EEE47.) The method according to EEE 45, wherein determining whether the current block is similar to neighboring blocks comprises evaluating block variances of the current block and neighboring blocks.

(EEE48.) The method according to EEE 45, wherein determining whether the current block is similar to neighboring blocks comprises evaluating inter or intra prediction modes of the current block and neighboring blocks.

(EEE49.) The method according to EEE 45, further comprising computing metrics for the one or more blocks.

(EEE50.) The method according to EEE 49, wherein selecting the coding mode is based upon Lagrangian minimization of the computed metrics, wherein the computed metrics measure inter-block similarity.

(EEE51.) The method according to EEE 49, wherein determining whether the current block is similar to neighboring blocks comprises evaluating the computed metrics.

(EEE52.) The method according to EEE 51, wherein the computed metrics are computed based upon reconstructed, predicted, and original samples of pixels within the one or more blocks.

(EEE53.) The method according to EEE 51, wherein applying a comprehensive optimization process comprises applying quantization parameters and selecting quantization parameters that minimize the computed metrics.

(EEE54.) The method according to EEE 51, wherein applying a comprehensive optimization process comprises applying two possible quantization offsets for a DC coefficient and selecting the quantization offset that minimizes the computed metrics.

(EEE55.) The method according to EEE 51, wherein applying a comprehensive optimization process comprises applying quantization to an upper reconstruction value for a DC coefficient and applying quantization to a lower reconstruction value for a DC coefficient and selecting the reconstruction value that minimizes the computed metrics.

(EEE56.) The method according to EEE 51, wherein applying a comprehensive optimization process comprises coding a full DC coefficient or zeroing out the DC coefficient and selecting the DC coefficient value that minimizes the computed metrics.

(EEE57.) A method for coding pictures in a video signal to improve video quality, the method comprising:
computing spatio-temporal statistics for a picture or one or more blocks of the picture;
selecting coding parameters for the picture or one or more blocks of the picture;
accessing a spatio-temporal statistics database, wherein the spatio-temporal statistics database comprises combinations of spatio-temporal statistics and coding parameters that cause perceptual problems with images;
determining if the selected coding parameters cause perceptual problems based on accessing the spatio-temporal statistics database;
if the selected coding parameters are determined not to cause perceptual problems, coding the picture or one or more blocks of the picture with the selected coding parameters; and,
if the selected coding parameters are determined to cause perceptual problems, filtering the picture or one or more blocks of the picture and then coding the filtered picture or filtered one or more blocks of the picture with the selected coding parameters.

(EEE58.) The method according to EEE 57, wherein filtering the picture or one or more blocks of the picture comprises modification of a DC value of a block or blocks of the picture.

(EEE59.) The method according to EEE 58, wherein modification of the DC value of a block or blocks of the picture comprises modification of the DC value of a block or blocks of the picture though addition or multiplication.

(EEE60.) The method according to EEE 57, wherein filtering the picture or one or more blocks of the picture comprises blending of one or more blocks of a current frame with collocated or motion-compensated prediction blocks from past or future pictures.

(EEE61.) The method according to EEE 57, wherein filtering the picture or one or more blocks of the picture comprises application of noise to the picture or one or more blocks of the picture.

(EEE62.) The method according to EEE 61, wherein the noise comprises random-generated noise with a selected random distribution.

(EEE63.) The method according to EEE 61, wherein the noise that is correlated with itself or correlated to content within the video signal.

(EEE64.) A method for coding pictures in a video signal to improve video quality, wherein each picture comprises one or more blocks and the method comprises:
selecting a current block of the one or more blocks
initializing quantization-related information;
computing spatio-temporal metrics for the current block;
determining whether the current block has spatio-temporal artifacts based on the computed spatio-temporal metrics;
if the current block is determined not to have spatio-temporal artifacts, coding the block; and,
if the current block is determined to have spatio-temporal artifacts, allocating additional resources to code DC coefficients of the current block and coding the current block with the additional resources.

(EEE65.) The method according to EEE 64, wherein allocating additional resources to code DC coefficients comprises assigning additional bits in coding a DC value of the current block.

(EEE66.) The method according to EEE 65, wherein assigning additional bits in coding a DC value comprises transmitting DC coefficients and compressing AC coefficients.

(EEE67.) The method according to EEE 66, wherein compressing AC coefficients comprises zeroing out AC coefficients that are below a selected threshold.

(EEE68.) The method according to EEE 65, wherein assigning additional bits in coding a DC value comprises assigning different costs to DC coefficients.

(EEE69.) The method according to EEE 65, wherein assigning additional bits in coding a DC value comprises applying quantization matrices that are configured for quantizing DC coefficients.

(EEE70.) The method according to EEE 64, wherein allocating additional resources to code DC coefficients comprises testing the impact of multiple reconstruction values for the DC coefficients to spatio-temporal neighbors of the current block.

(EEE71.) A system for coding input video to produce an output bitstream comprising:
an encoder and rate control module and
an encoder module receiving the input video and outputting a coded output bitstream, wherein the encoder and rate control module controls coding mode decisions and quantization components within the encoder module, and
wherein the encoder and rate control module comprises one or more processing systems that are configured for:
computing one or more sets of metrics for a picture, wherein each set of metrics are computed based on applying one or more different coding methods; and
selecting one or more coding methods from the applied one or more different coding methods, wherein selection of the one or more coding methods is based on the computed one or more sets of metrics.

(EEE72.) The system according to EEE 71, wherein the picture comprises a plurality of picture blocks and computing metrics for the picture comprises computing metrics for one or more of the picture blocks.

(EEE73.) The system according to EEE 72, wherein computing one or more sets of metrics for the picture comprises comparing pixels located at or near a perimeter of a block to pixels located at inner portions of a block.

(EEE74.) The system according to EEE 72, wherein computing one or more sets of metrics for the picture comprises comparing pixels located at or near a boundary of a picture block to pixels located at or near boundaries of one or more adjacent picture blocks.

(EEE75.) The system according to EEE 72, wherein each picture block has a block boundary and computing one or more sets of metrics for the picture comprises computing prediction errors for pixels of a picture block and applying a transform to the computed prediction errors, wherein the transform overlaps one or more block boundaries.

(EEE76.) The system according to EEE 75, wherein the prediction errors are computed for both spatial and temporal dimensions.

(EEE77.) The system according to EEE 71, wherein computing metrics for a picture comprises computing metrics for each component of a color signal.

(EEE78.) The system according to EEE 71, wherein the picture comprises one or more picture blocks and the method further comprises:
fixing an quantization strategy prior to computing one or more sets of metrics for a picture;
optimizing the one or more coding methods based on the computed one or more sets of metrics;
fixing the one or more coding methods selection; and,
optimizing the quantization strategy for each picture block based on the one or more coding methods selection prior to coding the picture.

(EEE79.) The system according to EEE 78, wherein selecting one or more coding methods comprises performing a Lagrangian minimization of spatial or temporal distortion metrics for each picture block.

(EEE80.) The system according to EEE 78, wherein selecting one or more coding methods comprises selecting a coding mode allocation for the picture in its entirety.

(EEE81.) The system according to EEE 71, wherein the picture comprises one or more picture blocks and the method further comprises:
selecting initial quantization parameters prior to computing metrics for the picture, and
selecting one or more coding methods based on the computed metrics comprises:
selecting one or more coding modes;
checking the selected one or more coding modes to determine if the one or more selected coding modes can create spatio-temporal artifacts;
if the selected one or more coding modes do not create spatio-temporal artifacts, applying a quantization process with selected quantization matrices and offsets as part of the coding method;
if the selected one or more coding modes can create spatio-temporal artifacts, checking whether a current picture block has spatio-temporal similarity with adjacent picture blocks;
if the current picture block does not have spatio-temporal similarity with adjacent picture blocks, applying a quantization process with selected quantization matrices and offsets as part of the coding method; and
if the current picture block has spatio-temporal similarity with adjacent picture blocks, applying an optimized quantization process as part of the coding method, whereby the optimized quantization reduces spatial artifacts or temporal artifacts or spatial and temporal artifacts.

(EEE82.) The system according to EEE 81, wherein checking whether a current picture block has spatio-temporal similarity with adjacent picture blocks comprises evaluating reconstructed and original average DC values of the current block and adjacent picture blocks.

(EEE83.) The system according to EEE 81, wherein checking whether a current picture block has spatio-temporal similarity with adjacent picture blocks comprises evaluating block variances of the current picture block and adjacent picture blocks.

(EEE84.) The system according to EEE 81, wherein checking whether a current picture block has spatio-temporal similarity with adjacent picture blocks comprises evaluating inter or intra prediction modes used to code the current picture block.

(EEE85.) The system according to EEE 81, wherein checking whether a current picture block has spatio-temporal similarity with adjacent picture blocks comprises evaluating spatial and temporal distortion metrics of the current picture block and adjacent picture blocks.

(EEE86.) The system according to EEE 81, wherein the optimized quantization process comprises applying several selected quantization parameters, measuring spatial and temporal metrics resulting from the application of each of the selected quantization parameters, and selecting quantization parameters that provide minimum spatial metrics, minimum temporal metrics, or minimum spatial and temporal metrics.

(EEE87.) The system according to EEE 81, wherein the optimized quantization process comprises applying two selected quantization offsets for a DC coefficient, measuring spatial and temporal metrics resulting from the application of each of the selected quantization offsets, and selecting quantization parameters that provide minimum spatial metrics, minimum temporal metrics, or minimum spatial and temporal metrics.

(EEE88.) The system according to EEE 81, wherein the optimized quantization process comprises applying quantization to an upper reconstruction value and a lower reconstruction value, measuring spatial and temporal metrics resulting from the application of the upper reconstruction value and the lower reconstruction value, and selecting the reconstruction value that provides minimum spatial metrics, minimum temporal metrics, or minimum spatial and temporal metrics.

(EEE89.) The system according to EEE 81, wherein the optimized quantization process comprises coding a full DC coefficient and zeroing out a DC coefficient, measuring spatial and temporal metrics resulting from the application of the full DC coefficient and the zeroed out DC coefficient, and selecting the DC coefficient that provides minimum spatial metrics, minimum temporal metrics, or minimum spatial and temporal metrics.

(EEE90.) The system according to EEE 71, wherein the system further comprises:
 a database of spatio-temporal statistics and coding parameters that result in image artifacts, and
 a prefilter controlled by the encoder and rate control module, wherein the prefilter receives the input video and provides filtered input video to the encoder module, and wherein selecting one or more coding methods based on the computed metrics comprises:
 selecting coding parameters for the picture;
 determining if the coding parameters cause image artifacts by accessing the database;
 if the coding parameters do not cause image artifacts, coding the picture with the selected coding parameters; and
 if the coding parameters cause image artifacts, pre-filtering the picture with the prefilter and coding the pre-filtered picture with the selected coding parameters.

(EEE91.) The system according to EEE 90, wherein the picture comprises a plurality of picture blocks and pre-filtering the picture comprises modifying a DC value of one or more picture blocks by addition or multiplication.

(EEE92.) The system according to EEE 90, wherein the picture comprises a plurality of picture blocks and pre-filtering the picture comprises blending of picture blocks in a current frame with prediction picture blocks from previous or future frames.

(EEE93.) The system according to EEE 90, wherein pre-filtering the picture comprises application of correlated noise to the picture.

(EEE94.) The system according to EEE 71, wherein the picture comprises a plurality of picture blocks and the method further comprises initializing quantization parameters prior to computing metrics for the picture and selecting one or more coding methods based on the computed metrics further comprises determining whether a current picture block is prone to artifacts based on the computed metrics; and wherein coding the picture with the selected one or mode coding methods comprises:
 if the current picture block is determined not to be prone to artifacts, coding the picture block with the selected one or more coding methods;
 if the current picture block is determined to be prone to artifacts, coding the picture block with additional bits for a DC value of the picture block; and
 repeating steps of determining whether a current picture block is prone to artifacts and coding each picture block until all picture blocks in the picture are coded.

What is claimed is:

1. A method for reducing artifacts in coded pictures comprising:
 computing one or more sets of metrics for a picture, wherein each set of metrics are computed based on applying one or more different coding methods;
 selecting one or more coding methods from the applied one or more different coding methods, wherein selection of the one or more coding methods is based on the computed one or more sets of metrics;
 coding the picture with the selected one or more coding methods;
 creating a database of spatio-temporal statistics and coding parameters that result in image artifacts and wherein selecting one or more coding methods based on the computed metrics comprises:
 selecting coding parameters for the picture;
 determining if the coding parameters cause image artifacts by accessing the database; and
 if the coding parameters do not cause image artifacts, coding the picture with the selected coding parameters; and
 if the coding parameters cause image artifacts, pre-filtering the picture and coding the pre-filtered picture with the selected coding parameters.

2. A method for reducing artifacts in coded pictures, comprising:
 computing one or more sets of metrics for a picture, wherein each set of metrics are computed based on applying one or more different coding methods;
 selecting one or more coding methods from the applied one or more different coding methods, wherein selection of the one or more coding methods is based on the computed one or more sets of metrics; and
 coding the picture with the selected one or more coding methods;
 wherein the picture comprises one or more picture blocks and the method further comprises:
 selecting initial quantization parameters prior to computing metrics for the picture, and
 selecting one or more coding methods based on the computed metrics comprises:
 selecting one or more coding modes;
 checking the selected one or more coding modes to determine if the one or more selected coding modes can create spatio-temporal artifacts;
 if the selected one or more coding modes do not create spatio-temporal artifacts, applying a quantization process with selected quantization matrices and offsets as part of the coding method;
 if the selected one or more coding modes can create spatio-temporal artifacts, checking whether a current picture block has spatio-temporal similarity with adjacent picture blocks;
 if the current picture block does not have spatio-temporal similarity with adjacent picture blocks, applying a quantization process with selected quantization matrices and offsets as part of the coding method; and if the current picture block has spatio-temporal similarity with adjacent picture blocks, applying an optimized quantization process as part of the coding method, whereby the optimized quantization reduces spatial artifacts or temporal artifacts or spatial and temporal artifacts.

3. The method according to claim 2, wherein checking whether a current picture block has spatio-temporal similarity with adjacent picture blocks comprises evaluating reconstructed and original average DC values of the current block and adjacent picture blocks.

4. The method according to claim 2, wherein checking whether a current picture block has spatio-temporal similarity with adjacent picture blocks comprises evaluating block variances of the current picture block and adjacent picture blocks.

5. The method according to claim 2, wherein checking whether a current picture block has spatio-temporal similarity with adjacent picture blocks comprises evaluating inter or intra prediction modes used to code the current picture block.

6. The method according to claim 2, wherein checking whether a current picture block has spatio-temporal similarity with adjacent picture blocks comprises evaluating spatial and temporal distortion metrics of the current picture block and adjacent picture blocks.

7. The method according to claim 2, wherein the optimized quantization process comprises applying several selected quantization parameters, measuring spatial and temporal metrics resulting from the application of each of the several selected quantization parameters, and selecting quantization parameters that provide minimum spatial metrics, minimum temporal metrics, or minimum spatial and temporal metrics.

8. The method according to claim 2, wherein the optimized quantization process comprises applying two selected quantization offsets for a DC coefficient, measuring spatial and temporal metrics resulting from the application of each of the two quantization offsets, and selecting quantization parameters that provide minimum spatial metrics, minimum temporal metrics, or minimum spatial and temporal metrics.

9. The method according to claim 2, wherein the optimized quantization process comprises applying quantization to an upper reconstruction value and a lower reconstruction value, measuring spatial and temporal metrics resulting from the application of the upper reconstruction value and lower reconstruction value, and selecting the reconstruction value that provides minimum spatial metrics, minimum temporal metrics, or minimum spatial and temporal metrics.

10. The method according to claim 2, wherein the optimized quantization process comprises coding a full DC coefficient and zeroing out a DC coefficient, measuring spatial and temporal metrics resulting from the application of the full DC coefficient and the zeroed out DC coefficient, and selecting the DC coefficient that provides minimum spatial metrics, minimum temporal metrics, or minimum spatial and temporal metrics.

11. A method for reducing artifacts in coded pictures, comprising:
    computing one or more sets of metrics for a picture, wherein each set of metrics are computed based on applying at least one of a plurality of different coding methods;
    selecting one or more coding methods from the applied at least one of a plurality of different coding methods, wherein selection of the one or more coding methods is based on the computed one or more sets of metrics; and
    coding the picture with the selected one or more coding methods;

wherein the method further comprises creating a database of spatio-temporal statistics and coding parameters that result in image artifacts and wherein selecting one or more coding methods based on the computed metrics comprises:

selecting coding parameters for the picture;

determining if the coding parameters cause image artifacts by accessing the database;

if the coding parameters do not cause image artifacts, coding the picture with the selected coding parameters; and if the coding parameters cause image artifacts, pre-filtering the picture and coding the pre-filtered picture with the selected coding parameters.

12. The method according to claim 11, wherein the picture comprises a plurality of picture blocks and computing one or more sets of metrics for the picture comprises computing metrics for one or more of the picture blocks.

13. The method according to claim 12, wherein computing one or more sets of metrics for the picture comprises comparing pixels located at or near a perimeter of a block to pixels located at inner portions of a block.

14. The method according to claim 12, wherein computing one or more sets of metrics for the picture comprises comparing pixels located at or near a boundary of a picture block to pixels located at or near boundaries of one or more adjacent picture blocks.

15. The method according to claim 12, wherein each picture block has a block boundary and computing one or more sets of metrics for the picture comprises computing prediction errors for pixels of a picture block and applying a transform to the computed prediction errors, wherein the transform overlaps one or more block boundaries.

16. The method according to claim 15, wherein the prediction errors are computed for both spatial and temporal dimensions.

17. The method according to claim 11, wherein computing one or more sets of metrics for a picture comprises computing metrics for each component of a color signal.

18. The method according to claim 11, wherein the picture comprises one or more picture blocks and the method further comprises:
    fixing a quantization strategy prior to computing one or more sets of metrics for a picture;
    optimizing the one or more coding methods based on the computed one or more sets of metrics;
    fixing the one or more coding methods selection; and,
    optimizing the quantization strategy for each picture block based on the fixed one or more coding methods selection prior to coding the picture.

19. The method according to claim 18, wherein selecting one or more coding methods comprises performing a Lagrangian minimization of spatial or temporal distortion metrics for each picture block.

20. The method according to claim 18, wherein selecting one or more coding methods comprises selecting a coding mode allocation for the picture in its entirety.

21. The method according to claim 11, wherein the computed metrics comprise spatial metrics that measure an extent to which a current coded block matches a spatial neighborhood of the current coded block once decoded and reconstructed.

22. The method according to claim 21, wherein the spatial metrics comprise an amount of smoothness of transitions across coded blocks or pixel areas.

23. The method according to claim 21, wherein the spatial metrics comprise at least one of a metric computed in a pixel domain across block boundaries, a metric weighting pixels at the block boundaries with larger weighting coefficients compared to inner blocks, and a transformed error calculation that overlaps block boundaries.

24. The method according to claim 23, wherein the spatial metrics include a form of color-space conversion-induced distortion.

* * * * *